(12) United States Patent  
Hill

(10) Patent No.: US 9,327,703 B2  
(45) Date of Patent: May 3, 2016

(54) TACTILE BASED PERFORMANCE ENHANCEMENT SYSTEM

(71) Applicant: Racing Incident Pty Ltd., Port Melbourne, Victoria (AU)

(72) Inventor: Peter Hill, Hawthorn (AU)

(73) Assignee: Racing Incident Pty Ltd., Melbourne (AU)

( * ) Notice: Subject to any disclaimer, the term of this patent is extended or adjusted under 35 U.S.C. 154(b) by 0 days.

(21) Appl. No.: 14/604,362

(22) Filed: Jan. 23, 2015

(65) Prior Publication Data

US 2015/0145665 A1    May 28, 2015

Related U.S. Application Data

(63) Continuation of application No. 14/046,758, filed on Oct. 4, 2013, now Pat. No. 8,941,476, which is a continuation of application No. 13/586,789, filed on Aug. 15, 2012, now Pat. No. 8,552,847.

(60) Provisional application No. 61/641,119, filed on May 1, 2012.

(51) Int. Cl.
```
B60Q 1/00       (2006.01)
B60T 17/22      (2006.01)
G06F 3/01       (2006.01)
H04B 3/36       (2006.01)
G09B 19/16      (2006.01)
B60Q 9/00       (2006.01)
G08B 6/00       (2006.01)
```
(52) U.S. Cl.
CPC . *B60T 17/22* (2013.01); *B60Q 9/00* (2013.01); *G06F 3/016* (2013.01); *G08B 6/00* (2013.01); *G09B 19/167* (2013.01); *H04B 3/36* (2013.01)

(58) Field of Classification Search
None
See application file for complete search history.

(56) References Cited

U.S. PATENT DOCUMENTS

| 5,080,207 | A |   | 1/1992  | Horneffer |
| 5,565,840 | A |   | 10/1996 | Thorner et al. |
| 5,973,441 | A |   | 10/1999 | Lo et al. |
| 6,002,349 | A |   | 12/1999 | Greene et al. |
| 6,044,313 | A | * | 3/2000  | Gannon ............. G01G 19/08 104/130.07 |
| 6,193,678 | B1 | * | 2/2001 | Brannon ............ A61H 23/0263 601/15 |

(Continued)

FOREIGN PATENT DOCUMENTS

WO    WO 2009/136345    11/2009

OTHER PUBLICATIONS

Benali-Khoudja, Mohamed et al., "Tactile Interfaces: A State-Of-The-Art Survey", ISR 2004, 35th International Symposium on Robotics, Mar. 23-26, Paris, France.

(Continued)

*Primary Examiner* — Travis Hunnings
(74) *Attorney, Agent, or Firm* — Knobbe, Martens, Olson & Bear, LLP

(57) ABSTRACT

A system is disclosed for communicating tactile messages to a user, such as a racecar driver, yacht crewmember, or other athlete. The system can include a tactile vest having tactile activators for conveying tactile messages to the user, including real time messages for helping the user assess and improve physical performance. The messages may be generated based on various types of sensor data, including, for example, data collected by vehicle sensors of a racecar or yacht.

31 Claims, 7 Drawing Sheets

(56) References Cited

U.S. PATENT DOCUMENTS

| | | | |
|---|---|---|---|
| 6,416,327 B1 | 7/2002 | Wittenbecher | |
| RE38,877 E | 11/2005 | Trabut | |
| 7,167,781 B2 | 1/2007 | Lee | |
| 7,262,712 B2 | 8/2007 | Greene | |
| 7,331,871 B2 | 2/2008 | Lopez | |
| 7,398,140 B2 | 7/2008 | Kernwein et al. | |
| 7,692,552 B2 | 4/2010 | Harrington et al. | |
| 7,696,860 B2 * | 4/2010 | Gilson | G06F 1/163 340/407.1 |
| 7,798,578 B2 * | 9/2010 | Lewis | B60K 6/48 180/65.21 |
| 7,902,693 B2 | 3/2011 | Hijikata et al. | |
| 8,126,603 B2 | 2/2012 | Chaperon et al. | |
| 8,141,414 B2 * | 3/2012 | Braghiroli | G01B 11/22 340/442 |
| 8,515,633 B2 | 8/2013 | G V et al. | |
| 8,552,847 B1 * | 10/2013 | Hill | G06F 3/016 116/205 |
| 8,941,476 B2 * | 1/2015 | Hill | G06F 3/016 116/200 |
| 2003/0227374 A1 | 12/2003 | Ling et al. | |
| 2003/0229447 A1 | 12/2003 | Wheatley et al. | |
| 2005/0132290 A1 * | 6/2005 | Buchner | G06F 1/163 715/702 |
| 2006/0119474 A1 | 6/2006 | Requejo et al. | |
| 2007/0093944 A1 | 4/2007 | Lee | |
| 2008/0004763 A1 * | 1/2008 | Johnson | G01G 19/08 701/31.4 |
| 2008/0042489 A1 * | 2/2008 | Lewis | B60K 6/48 303/152 |
| 2008/0120029 A1 * | 5/2008 | Zelek | G01C 21/20 701/469 |
| 2008/0153590 A1 | 6/2008 | Ombrellaro et al. | |
| 2008/0174451 A1 | 7/2008 | Harrington et al. | |
| 2009/0248260 A1 | 10/2009 | Flanagan | |
| 2010/0000310 A1 * | 1/2010 | Braghiroli | G01B 11/22 73/146 |
| 2010/0033313 A1 | 2/2010 | Keady et al. | |
| 2010/0178637 A1 | 7/2010 | Lecointre et al. | |
| 2010/0238007 A1 * | 9/2010 | Kikuchi | B60C 23/04 340/438 |
| 2010/0328051 A1 * | 12/2010 | Hale | G09B 21/003 340/407.1 |
| 2011/0268300 A1 | 11/2011 | DeMers et al. | |
| 2014/0038137 A1 | 2/2014 | Hill | |

OTHER PUBLICATIONS

International Search Report for PCT Application No. PCT/2013/038678, mailed Sep. 16, 2013.

* cited by examiner

TACTILE BASED PERFORMANCE ENHANCEMENT SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference and made a part of this specification.

BACKGROUND

Racecar drivers and other athletes commonly rely on sensor data to evaluate and improve their performance. Typically, however, the relevant sensor data and reports are provided to the athlete only after the performance is complete. For example, a racecar driver may, as part of a training session, complete several laps on a track and then stop to review a report that is based on collected sensor data.

BRIEF DESCRIPTION OF THE DRAWINGS

The features of the inventions disclosed herein are described below with reference to the drawings of the preferred embodiments. The illustrated embodiments are intended to illustrate, but not to limit the inventions. The drawings contain the following figures.

DETAILED DESCRIPTION OF SPECIFIC EMBODIMENTS

Figure 1:
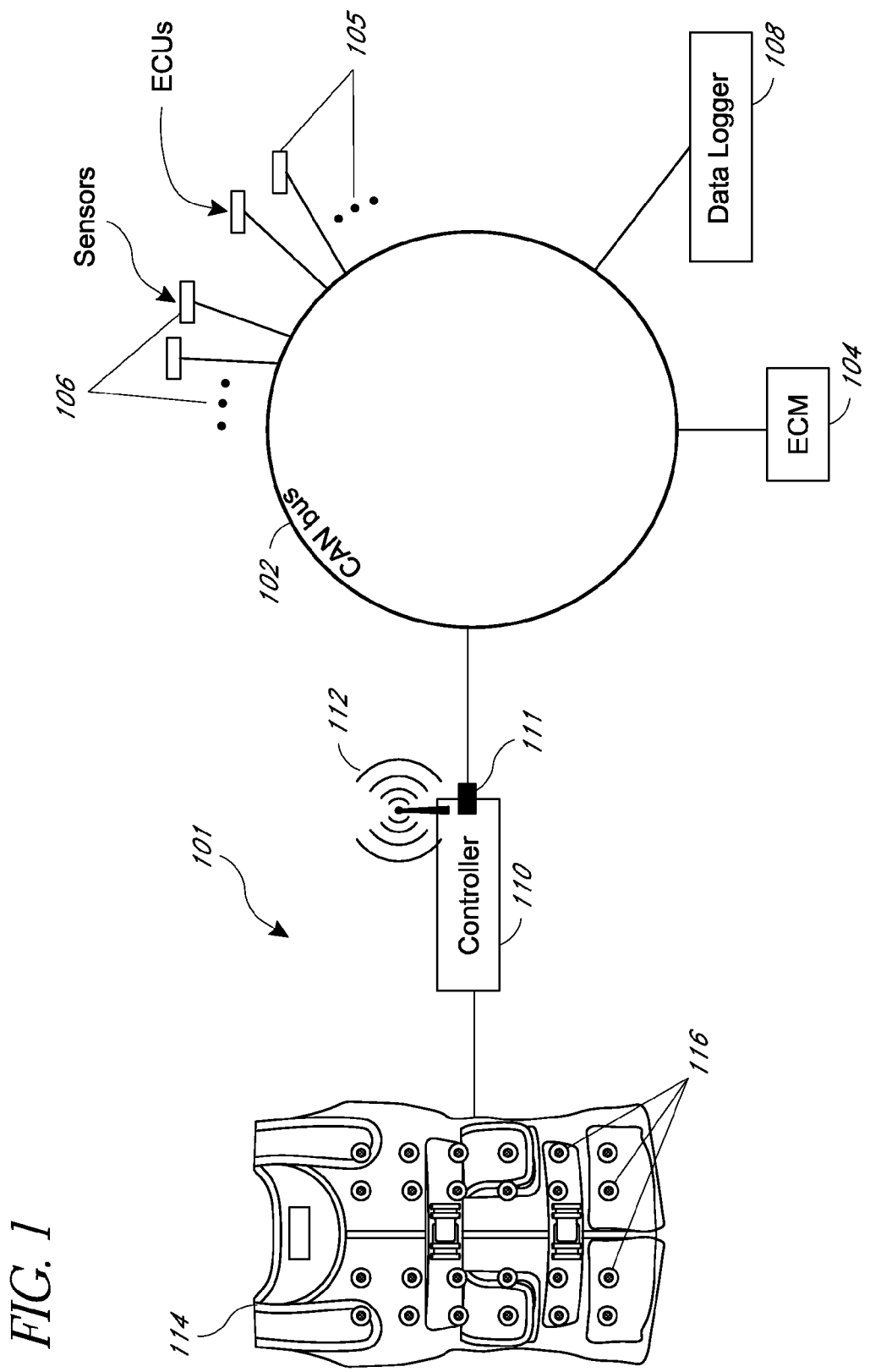
FIG. 1 illustrates an example embodiment of a tactile apparatus connected to a vehicle.

While the present description sets forth specific details of various embodiments, it will be appreciated that the description is illustrative only and should not be construed in any way as limiting. Additionally, although particular embodiments of the present inventions may be disclosed or shown in the context of motorsports, such embodiments can be used as for other sports or vehicles such as downhill skiing, boat racing, and/or trains, respectively. Further, various applications of such embodiments and modifications thereto, which may occur to those who are skilled in the art, are also encompassed by the general concepts described herein.

A gap in time between performing a human action and reviewing a performance report based on that action can impede on the ability of the athlete to identify the particular actions (control inputs) and events that improve or degrade performance. With the amount of data available today, the complexity of transmitting critical information in a readily perceived format is critical. A human's exteroceptive system includes nerves that respond to stimuli emanating from outside of the body via the five basic senses: sight, hearing, taste, smell, and touch. The sense of touch, including body awareness, is comprised of both tactile and kinesthetic sensory components and a motor subsystem. The tactile sense arises from activation of the cutaneous sensors. Tactile systems include sensors located within the skin that capture sensations such as pressure and vibration, temperature, and pain at the skin's surface.

A system is disclosed for enabling racecar drivers (and in some embodiments, other types of athletes and/or drivers) to monitor and improve their performance through tactile stimulation. In a preferred embodiment, the system includes a tactile apparatus, such as a tactile vest that is worn by the driver. The vest can include an array of tactile stimulation devices that can be electrically coupled to a controller. The controller monitors various parameters of the vehicle's operation (e.g., speed, engine RPM, wheel balance, vehicle location relative to turns), and uses this information to generate tactile messages that are conveyed to the driver. The system can have a wired and/or wireless transceiver to receive information from one or more data sources, such as a CAN bus of the vehicle, a global positioning system, and/or a computing device that is external to the vehicle.

Depending upon how the system is configured, the system may, via tactile stimulation signals or messages, convey a variety of different types of information, including real time information, to the driver. For example, the system may signal to the driver when to shift or brake, or may notify the driver whether a shifting or braking operation was performed too early or too late. The system can have a user interface for selecting when and what types of tactile messages are to be delivered. The system may, for example, be used to provide real time feedback and guidance to drivers during racing or training. The system can replace or supplement visual or auditory messages the driver may receive during racing or training.

In some embodiments, the system can prioritize messages for tactile delivery to the driver based on message type. For example, a cue signal based on a trigger event conveying to the driver to perform an action can be prioritized over a feedback signal conveying tactile information regarding driver performance. Further, tactile messages received from external sources can be delayed and prioritized to be delivered to the driver after the system determines that there are no other tactile messages (e.g., cue signals or feedback signals) to be delivered. Lower priority messages can be postponed and queued to be delivered to the driver once higher priority or more time critical messages have been delivered.

Another embodiment of the system enables yacht crewmembers to monitor and improve their performance through tactile stimulation. In some embodiments, the system collects data via sensors of the yacht, and uses this information to generate messages that are transmitted wirelessly to one or more tactile vests or other tactile devices worn by one or more members of the yacht's crew. Depending upon how the system is configured, the system may, via tactile stimulation signals or messages, convey a variety of different types of information, including real time information, to the crewmember(s). The system's controller monitors various parameters of the yacht's operation or yacht information (e.g., tiller/wheel position, sail trim, yacht lean, yacht direction, yacht speed), and may also monitor various sailing conditions or sailing information (e.g., wind direction, wind strength, sea state, tide, course boundaries, reference points, crewmember location on the yacht). Based on this information, the system may, for example, convey to a crewmember, via a tactile messages, information or instructions regarding adjustments of control inputs (e.g., tiller/wheel position, sail trim, yacht lean, crewmember location on the yacht) to be performed.

The system may also use tactile messages to, for example, provide cues related the order of tasks to be performed, warn of in an impending event, provide information related to the position of nearby yachts, provide information related to sailing conditions, and/or provide instructions regarding crewmember positioning.

Other embodiments of the system and associated methods can be used in other sports to improve performance. For example, in Freestyle Moto X, the system can augment a driver's sense of location to help safely land during a trick being performed. The system can communicate to the driver if enough vehicle speed is being attained to perform a particular trick. Similarly, the system can be used in non-motorized sports such as downhill skiing. The system can, for example, provided real time feedback on the effect of a maneuver on downhill speed.

Embodiments of the system can also be used in non-sport contexts. For example, in one embodiment, the system can provide tactile messages conveying to a train engineer if the locomotive is traveling at a safe speed for an approaching corner. The tactile device can also act as a reminder to sound the horn when the locomotive is approaching the corner.

Motorsport Racing Applications

FIG. 1 illustrates an example embodiment of a system for enabling racecar drivers to monitor and improve their performance through tactile stimulation. The system with a tactile apparatus 101 can be connected to a CAN bus 102 of a vehicle. In some embodiments, the system can include a vest 114 that is worn by a driver. The vest 114 can include an array of tactile stimulation devices 116 that can be electrically coupled to a controller 110. The controller 110 can be connected to the car's CAN bus 102 and monitors various parameters of the vehicle's operation (e.g., speed, RPMs, wheel balance, location relative to turns). The controller 110 may also receive and analyze other sources of information, such, for example, global positioning data, beacon data, predetermined messages, etc. The connection to the controller 110 can be wireless through a wireless transceiver 112. Depending upon how the system is configured, the system may, via tactile stimulation signals or messages, convey a variety of different types of information, including real time information, to the driver. For example, the system may signal to the driver when to shift or brake, or may notify the driver whether a shifting or braking operation was performed too early or too late. The system may, for example, be used to provide real time feedback and guidance to drivers during racing or training. The system can replace or supplement visual or auditory messages the driver may receive during racing or training.

Tactile Senses

In environments such as motorsport racing and other data intensive sports, human senses such as hearing, vision, and smell can be overpowered and impaired. A racecar driver receives a plethora of visual and auditory signals while driving. For instance, while driving, the driver visually keeps track of lap times, speed, engine revolutions per minute, engine settings, wing angle, gear selection, differentials, power steering, and other operational parameters of the car. Further, the driver is not only surrounded by the noise of the driver's own car and other cars, but the driver is also receiving auditory messages from the pit crew. Research has shown that while the driver may initially be aware of any visual and auditory cues available, after a period of time, the visual and auditory cues fade into the background and become no longer consciously cognizable. Further, adding visual and auditory messages has been shown to affect lap times. Thus, where visual and auditory information channels would only compete with data necessary for optimal performance of maneuvering a racing vehicle, tactile sensations can be valuable in providing an additional information channel. A tactile system not only allows for communication of information through an alternative channel, but also does not interfere with existing visual or auditory messages. A tactile cue to the driver minimizes distractions to the driver and enhances the time drivers spend with their eyes and attention focused on the road, instead of the control interface. Vision and hearing is already occupied by race situations and the basic demands of a driving a racecar. Further, vision and hearing lack the sense of "feel" drivers often reference in fine tuning their responses to car movement. Therefore, drivers will be more likely to receive and attend to tactile information as compared to additional visual or auditory information. Since information received tactually should not compete with other visual and auditory signals for mental resources, its impact on mental workload can be minimal. Such information has the ability to be easily integrated into a motorsport driver's task workload.

Research has shown the brain can decipher and quickly learn tactile cues. Because the brain can quickly develop and process patterns such as variations in frequency, wavelength, and/or intensity, a driver can learn to decode tactile messages. Harnessing this, a motorsport driver can benefit from a communication language using tactile apparatuses, devices, system, and methods that can instruct, cue, guide, and/or provide information to the driver. Numerous benefits that can be achieved in the arena of motorsports as well as other fields of sports where performance and timing enhanced perception are required. In some embodiments, one of the benefits can be a speeding up of the feedback loop in real time improvements in the motorsport driver performance. Better and more sophisticated driver information can help make more accurate estimations of the response of racecars to certain driver inputs. In addition to better driver information, the volume of data a driver receives can be increased because tactile messages are not or minimally competing for brain bandwidth with any existing visual and auditory cues. Performance data becomes a sense of feel in real time rather than a post event analytical tool, eliminating or reducing a driver's need to use memory or visualization in interpreting the data.

Current Motorsport Learning Techniques

As with other sports, motorsports racing currently utilizes trial-and-error learning techniques. A driver will repeat a race course many times, analyzing any mistakes made after the fact. Over time, incremental improvements are made until the correct maneuvers become innate. If the driver is talented, the after the fact learning technique may be effective. However, even for a talented driver, this process can often be slow and limited. Only incremental improvement steps are made with each trial and error. This is a slow and inaccurate learning process. Memory is an unreliable source of information and imagining complex data on a screen as real life movement is difficult to comprehend. Further, a driver may simply not be aware of the kinds of inefficient maneuvers being made. This complex learning process is shown in FIG. 2.

Figure 2:
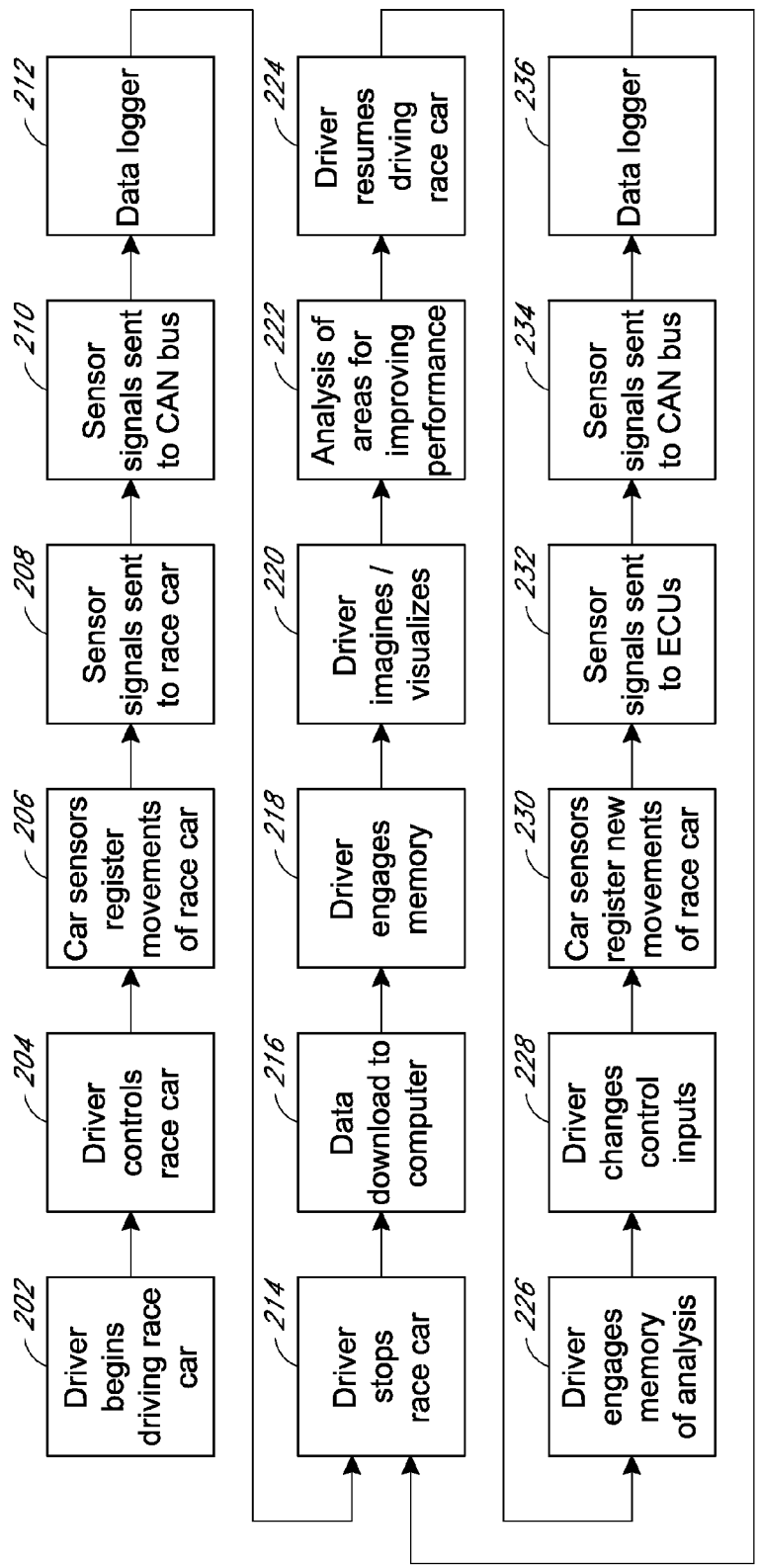
FIG. 2 illustrates an example diagram showing the present performance improvement model utilized in motorsports.

FIG. 2 illustrates the process commonly used in motorsports for drivers to improve their performance. At block 202, the driver is driving a racecar on a track. At block 204, driver uses physical body movements or control inputs to maneuver and control the car around the track, particularly during cornering and momentum changes of the racecar such as acceleration and braking. At block 206, car sensors register movements of the car as induced by driver control inputs. At block 208, the sensor signals are sent to a plurality of electronic control units (ECU) that control various functions of the car such as traction control. The main ECU processor is the engine control unit or engine control module (ECM) that controls the engine via various sensors accounting for driver control inputs such as depression of the brake or gas pedal. The data from the sensors, ECUs, and/or ECM can be sent around the car's central system called a CAN bus at block 210 before, simultaneously, or after the signals are sent to the ECUs at block 208. The CAN bus is a vehicle communication protocol without a host computer. Connected to the CAN bus is a data logger that records, block 212, the information based on the car's movement received through the car sensors and sent through the CAN bus. The car's movement information can include wheel speed as determined by tire rotation, wheel spin relative to other wheels, wheel slip, revolution per minute of the engine, braking, acceleration, vehicle weight distribution, etc.

Since the origins of data logging in 1980s, the rate of logging and the number of channels logged have substantially risen. The rise in data logging can create an overwhelming amount of information for a driver to digest and visualize. What has not changed is the way the data is presented to the driver for analysis and self-correction. At block 214, the driver completes the practice run and stops the car. At block 216, the data is downloaded to a computer and presented to the driver in various visual formats such as track recorded video, charts, and/or tables. At block 218 and 220, the driver engages his memory to imagine and visualize the events during the practice run. The driver is thus essentially required to relive the practice run entirely post event. The driver tries to remember the experience while at the same time imagining the specific car movements in question. The teams and its drivers set goals, entry and exit speeds, entry and exit lines, entry and exit decelerations and accelerations, action points, corner speeds, effects of sectors (time gain or loss from reference points), grip use, power use, etc. The process requires piecing together many variables in a post event analysis, which can be inaccurate and slow with performance improvements made in small, incremental steps. Further, areas for improvement may be entirely missed as the driver fails to recall specific events or does not connect his actions with what is reported during data analysis through the track recorded video, charts, and/or tables.

After deciding on potential areas of improvement based on the analysis, block 222, such as altering physical body movements and/or adjusting the car, the driver enters the car again and repeats the practice run, block 224. During the resumed practice run, block 226, the driver attempts to engage the memory of data and analysis of blocks 218 to 222 to change driving tactics and/or body movements to alter the control inputs into the car, block 228. The sensors register the new car movements of the racecar, block 230, and the data is logged by the data logger with the same procedure of recording the car movements at blocks 232 to 236 as described for blocks 208 to 212. The driver then repeats the process starting at block 214 by stopping the racecar and repeating the analysis of blocks 216 to 222.

The process flow of FIG. 2 can take more than 20 minutes. This process is slow. Further, the improvement in performance is only incremental and not necessarily optimized as it relies on many imperfect links such as the driver's memory. An improvement to this process can be to provide real time feedback of the same information as the driver analyzes at blocks 216 to 222. Real time feedback can minimize or eliminate the need for post event analysis.

Motorsports is a multi-billion dollar industry with teams spending alone being many billions of dollars. A gain of a fraction of a second in improved performance through new technology can translate into millions of dollars in revenue for a team. Some motorsport regulations do not allow for certain manipulations of car controls through the use of sensors, such as the use of antilock braking system (ABS) or manipulating ECUs in other ways to gain a competitive edge. Motorsport regulations may allow teams to manipulate the ECUs in only limited ways such as providing fuel information or traction control. However, motorsport regulations typically do not restrict the teams from gathering, logging, and analyzing all the information available with existing car sensors. Further, motorsport regulations typically do not restrict the type of or amount of sensors available on a car. Thus, teams can add more sensors to the car if more information about performance is desired.

The regulations allow for the driver to receive available sensor information, including receiving the information in real time. In fact, many types of real time information are already relayed to the driver such as speed, sector times, RPM, flag signals, gear selection, and other messages such as auditory messages from the pit crew. Teams have researched how to increase the types of real time information delivered to the driver. For instance, teams have attempted to deliver to the driver optimum shift points by either visual cues, such as green, yellow, red flashes, or similarly indicative auditory cues. This research has shown that not only are the visual and auditory cues competing with other signals for the driver's mental bandwidth, the signals can be filtered out by the driver during periods requiring hand eye coordination. Yet, the extra information to optimize performance can be vitally important to improve lap times, reduce testing costs, extend tire wear, and enhance pit stop procedures. Teams that can effectively deliver the needed performance information to all team members, including the driver, can increase performance leading to increased team revenues while reducing team long term costs. Delivering real time information through tactile cues can reduce or eliminate the need for a user of a tactile apparatus to view or listen to the performance information in a post event analysis.

Delivering Real Time Information

FIG. 1 illustrates an embodiment of a tactile apparatus 101, in which a driver-worn vest 114 is linked to a car's preexisting CAN bus 102 via a controller 110. The CAN bus 102 is the car's central information system that links the car's electronic components such as an ECM (Engine Control Module) 104, ECUs (Electronic Control Units) 105, sensors 106, and a data logger 108. The ECM 104 can control engine functions such as fuel injection and rev control limits. The car sensors 106 can detect car movements such as wheel spin while the ECUs 105 can control, within certain limits, the wheel spin based on signals from the sensors 106 to provide, for example, traction control. While a car may already have many sensors 106, teams can add additional car sensors 106 as needed depending on data that is desired to be collected. For example, a team may add a sensor 106 to measure brake line pressure if a car does not already have a sensor 106 monitoring this variable. The data logger 108 can log data from the ECM 104, ECUs 105, and/or sensors 106 that is transmitted through the CAN bus 102.

As discussed for FIG. 2, the driver can later analyze his or her performance by extracting the information from the data logger 108 and performing the steps described for blocks 216 to 222. To avoid or mitigate the need to rely on the post event analysis discussed for blocks 216 to 222, the performance information (and/or associated cues, feedback messages, etc.) can be communicated to the driver in real time using a tactile apparatus 101. In an embodiment, the performance information is communicated using a tactile apparatus 101 such as a tactile vest 114. A tactile vest 114 can have a plurality of activators 116 (e.g., tactile devices) that are arranged and controlled such that different types of messages can be conveyed to the driver through different stimulation sequences and patterns.

The controller 110 can receive sensor signals from the CAN bus 102 through a wired transceiver 111 and/or a wireless transceiver 112 using any appropriate signal interface(s) and protocol(s). Preferably, the controller acts as a passive node on the CAN bus, meaning that it monitors signals on the CAN bus but does take any action that directly affects the vehicle's operation. The controller 110 can determine the tactile sequences to be delivered to the driver based on the data received from the CAN bus and based on various programmatic criteria. In some cases, the controller 110 may also use other sources of information (other than the CAN bus) to select tactile stimulation to apply. For example, the controller 110 may include a GPS device that uses both GPS signals and local beacons to accurately determine the car's real time location; in such embodiments, the controller 110 may use this additional source of information to, for example, select shifting-related tactile signals to apply to the driver.

In embodiments in which a wireless transceiver 112 is provided, the controller 110 can also receive a tactile message to be communicated to the driver through the wireless transceiver 112. For example, a team member may send a known or predetermined tactile message to the driver instead of communicating through a radio. The wireless transceiver 112 can be part of the controller 110 or any other part of the system depicted in FIG. 1 such as being directly connected to the CAN bus 102. In some cases, the wireless transceiver 112 may be capable of communicating with a device that is external to the vehicle; where this is the case, another team member or another controller outside the system depicted in FIG. 1 can determine and send a tactile message to the driver through the wireless transceiver 112.

The tactile vest 114 can communicate information to the driver via the tactile sense comprising a plurality of activators 116 for generating and transmitting a tactile sequence or message. The activators 116 can provide any suitable output that may be perceived by the exteroceptive sense, including the tactile sense such as awareness of stimulation to the outer surface of the body from any external source. The tactile sense of the driver thus includes, but is not limited to mechanoreceptors, nocioreceptors, and thermoceptors. The tactile sequences discussed herein may be translated by the driver's ability to sense vibration, touch, stress, pressure, temperature, pain, etc. The activators 116 can include tactors, transducers, electromechanical vibrating motors, piezo-buzzers, vibrotactile activators, pressure activators, and/or other tactile devices. Although a vest 114 is shown, other embodiments can communicate the tactile message using other tactile apparatuses that can incorporate haptic activators 116 such as a belt, a headband, an arm or wristband, a forearm band, a thigh band, and/or other parts of the driver's body as long as the driver can discern the tactile messages. In yet other embodiments, the haptic activators 116 can be incorporated into the racecar itself such as attaching haptic activators to the steering wheel, steering wheel paddles, brake pedal, accelerator pedal, driver seat, and/or other racecar parts such that the driver is able to discern the tactile message.

In one embodiment, to deliver a tactile message, the haptic activators 116 may vibrate at a varying frequency, wavelength, and/or intensity in a particular location on the driver's body. The activators 116 or can be lined vertically or horizontally to, for instance, convey a gradient. For example, the brake line pressure can be conveyed to the driver depending on how far up the driver's torso the activators 116 are activated. For low brake line pressure, the activators 116 can vibrate near the abdomen. For high or increasing brake line pressure, the activators 116 closer to the driver's chest can be activated, mimicking a gradient. As the brake line pressure decreases, the activators 116 near the driver's chest can be deactivated. In other embodiments, a tactile message can move vertically downwards a driver's body such as a first activator being activated near the chest and as the tactile message changes or varies, a subsequent activator closer to the abdomen is activated.

In one embodiment, the activation of the haptic activators 116 is a linear level indicator or gradient, where the activators 116 near the abdomen remain activated as the activators 116 near the chest are subsequently activated. In other embodiments, the activators 116 near the abdomen are sequentially deactivated as the activators 116 near the chest are activated. In yet other embodiments, the combination of linear level indication or gradient and sequential deactivation as well is used to convey different types of tactile messages. In further embodiments, the gradient and/or sequential deactivation is conveyed horizontally across the driver's body such across the abdomen and/or across the chest from left to right and/or right to left. In yet further embodiments, the tactile message is communicated using a diagonal tactile message cues such as moving from the driver's left chest area to the right abdomen area, right chest area to the left abdomen area, left abdomen area to the right chest area, and/or right abdomen area to the left chest area. In some embodiments, other tactile pattern variations can include activating a specific set of activators 116 such as two, three, four, five, etc. activators 116 simultaneously or sequentially in a specific pattern such as a triangle, square, and/or polygon. The various types of activators and patterns discussed herein can also be applied to the driver's back. In certain embodiments, any combination of patterns discussed herein as well as other variations can be utilized to deliver a tactile message.

Figure 3:
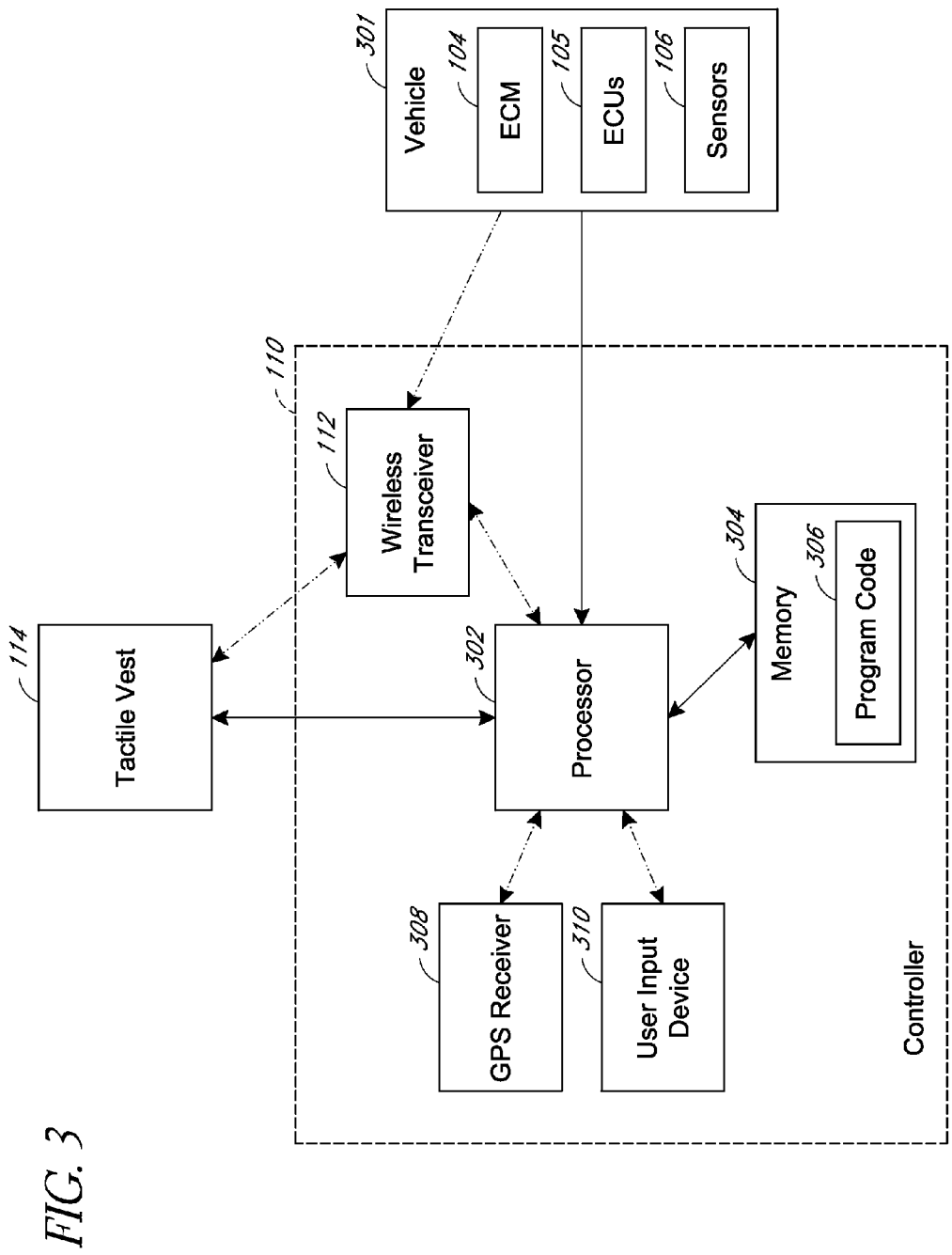
FIG. 3 illustrates an example embodiment of a controller of a tactile apparatus.

FIG. 3 is a block diagram showing elements of an exemplary implementation of a tactile apparatus 101 with a controller 110. The controller 110 can be in the form of any suitable computing device or board, and is typically a portable device that attaches to the vest 114. In the illustrated embodiment, the controller 110 has a processor 302 and a computer readable memory 310 that stores program code 306. The program code 306 implements the algorithms and program logic for performing the various functions described herein, including the analysis of vehicle-related information and the generation of tactile messages to be applied via the vest. The controller 110 may be controlled by a dedicated battery or by the vehicle's battery. The controller 110 can be integrated inside the vest 114, or can be outside of and connected to the tactile vest 114. The processor 302 can send information to and receive information from the tactile vest 114. The processor 302 can be connected to a vehicle 301 to receive signals from an ECM 104, ECUs 105, and/or sensors 106 within the vehicle 301. In certain embodiments, the processor 302 can receive signals from the vehicle 301, but cannot send signals to the vehicle 301 or otherwise directly control the vehicle. The processor 302 is preferably a microprocessor or microcontroller, but may alternatively be, for example, an application-specific integrated circuit (ASIC), FPGA, or other device that includes application-specific circuitry. Although a single processor 302 is shown, the controller 110 may include multiple distinct processors in some embodiments.

In one embodiment, the processor 302 can be connected to a GPS (global positioning system) receiver 308 to receive GPS information as described herein. The processor 302 can send information to and receive information from the GPS receiver 308. The processor 302 can be connected to a user input device 310 to receive user input as described herein. The processor 302 can send information to and receive information from the user input device 310. The user input device can include, for example, a keypad and a display, or a touchscreen, for enabling the driver or driver team to view and adjust various configuration settings. The controller 110 could additionally or alternatively support voice recognition, gesture recognition, and/or other types of user input. In embodiments where the user input device 310 includes a software-based user interface, the user interface may display status information of the tactile apparatus 101 based on the information sent to the user interface by the processor 302.

As illustrated, the processor 302 may be connected to a wireless transceiver 112. The wireless transceiver 112, if present, enables the processor 302 to communicate wirelessly with the vehicle 301, the tactile vest 114, and/or a pit crew computing device that is external to the vehicle. The wireless transceiver 112 can also enable the processor 302 to wirelessly communicate with the GPS receiver 308 and/or the user input device 310. Although a single wireless transceiver 112 is shown, separate wireless transceivers may be provided for communication with different systems or entities. The wireless communications, if any, with the vehicle 301, vest 114, and/or different systems or entities may either replace or supplement wired communications. In certain embodiments, the GPS receiver 308, the user input device 310, and/or wireless transceiver 112 may be omitted as illustrated by the dashed arrows of FIG. 3.

Figure 4:
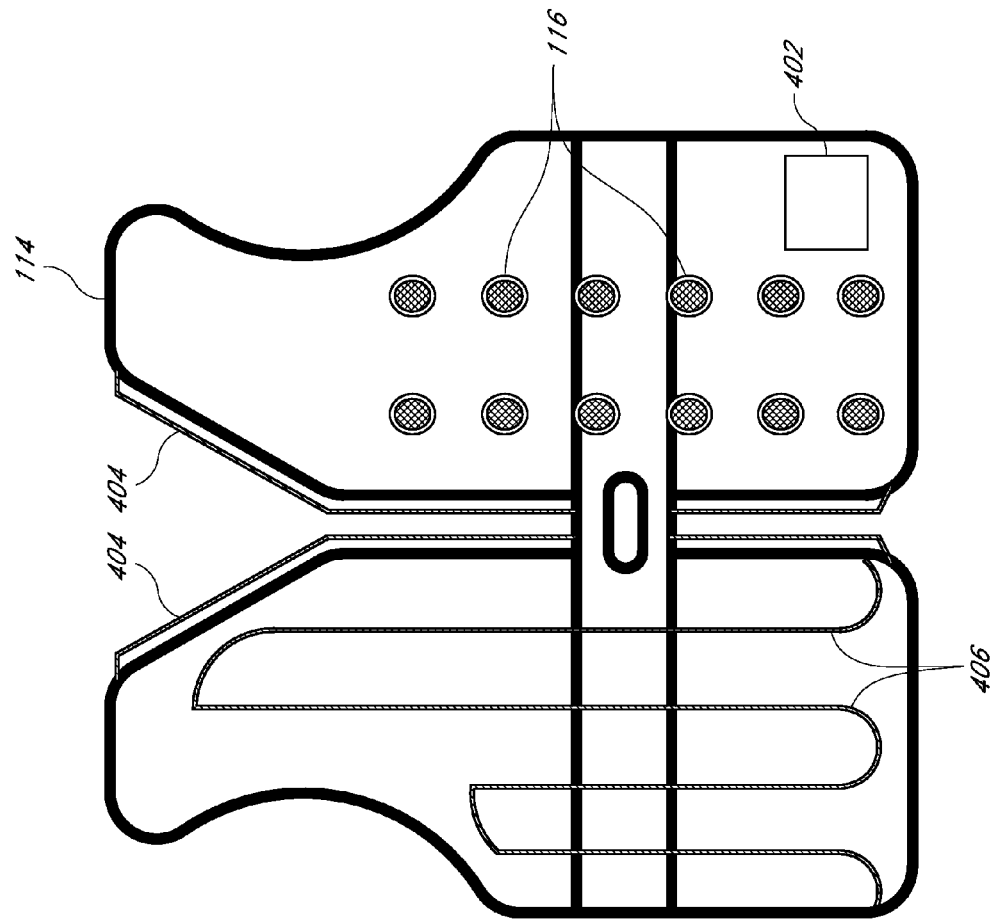
FIG. 4 illustrates an example embodiment of a tactile apparatus as a tactile vest.

FIG. 4 illustrates one embodiment of a tactile vest 114. The tactile vest 114 can have haptic activators 116 as illustrated in FIG. 1. While the activators 116 in FIG. 4 are shown to be on one side of the tactile vest 114 for illustration purposes, the activators 116 can be on both sides of the vest and can be located on one or both sides the backside of the tactile vest 114. In one embodiment, the tactile vest 114 can have a slip layer 404 that covers the activators 116 in order to prevent snagging of the activators 116 against other parts of the tactile vest 114, other garments of a driver, and/or bare skin of the driver. The slip layer 404 can be fire retardant. The activators 116 can be connected to a haptic activator driver circuit 402. The controller 110 as described herein can have and/or be connected to the haptic activator driver circuit 402. The driver circuit 402 can have batteries to power the activators 116. In some embodiments, the driver circuit 402 can have a connection to an external power source to power the activators 116.

The tactile vest 114 can have a built-in cooling system. The cooling system can have cooling tubes 406. In one embodiment, the cooling system is a self-contained cooling system that may utilize dry ice to help keep a driver cool in a racecar cockpit, which can be a hot environment as engine heat dissipates. While the cooling tubes 406 in FIG. 4 are shown to be on one side of the tactile vest 114 for illustration purposes, the cooling tubes 406 can be on both sides of the tactile vest 114 and can also be located on the backside of the vest 114. In one embodiment, the tactile vest 114 is a S.A.F.E. Coolshirt vest with activators 116 integrated into the S.A.F.E. Coolshirt vest.

In an embodiment, the controller 110 can be configured to receive input information, which can include vehicle information, execution information, auxiliary information, and/or user information. The classification of the input information does not limit the functionality of the described embodiments of the inventions herein. Rather the classification of the input information is for discussion purposes. The vehicle information, also referred to as signal sensor data or vehicle sensor information, can be based on signals from car sensors. The execution information can be based on signals from car sensors and/or signals from auxiliary sensors such as a global positioning system. The auxiliary information can be based on signals from auxiliary sensors such as pit crew information. Vehicle information can, for example, overlap with auxiliary information because, for instance, wheel speed as determined by tire rotation may match the speed of the vehicle as determined by movement of the vehicle itself. However, the wheel speed can be different from the vehicle speed as determined by a global positioning system depending on the wheel slip relative to the surface of travel. Execution information can be the same as auxiliary information such as for acceleration. Acceleration can be execution information as determined by the acceleration a driver achieves with reference to a maximum acceleration that could have been achieved based on optimum balance of a vehicle weight on all four tires. Acceleration can also be auxiliary information based on actual vehicle acceleration relative to the surface of travel as determined by a global positioning system.

The vehicle information can include characteristics of vehicle operation such as power use, fuel consumption, wheel speed as determined by tire rotation, wheel spin relative to other wheels, wheel slip, revolutions per minute of the engine, gear selection, accelerator pedal position, brake pedal position, brake pad position, brake line pressure, steering angle, transitional input ramps, vehicle weight distribution, and vehicle momentum, which can be used by the controller to generate tactile messages as described herein. The execution information can include time gain or loss from reference laps, time gain or loss from reference points, timing of gear selection, braking rate, acceleration, steering angle, entry and exit speeds, entry and exit lines, entry and exit decelerations and accelerations, and grip use, which can be used by the controller to generate a tactile message as described herein. The auxiliary information can include input from a global positioning system, vehicle location, vehicle speed, tire wear, acceleration, deceleration, radius for approaching corner, speed for approaching corner, pit crew information, and reference points including for braking, steering angle, acceleration, and approaching corners, which can be used by the controller to generate a tactile message as described herein. Based on the received input information, the controller 110 can generate a tactile message in real time or near real time, at a predetermined time, and/or at particular time intervals, which may be identical or different. In one embodiment, user(s) can query an input device for real time or near real time information.

The user information can include information from a driver wearing a tactile apparatus 101 and/or at least one other user able to communicate with the tactile apparatus 101. In an embodiment, either a driver wearing a tactile apparatus 101 or another user not wearing the tactile apparatus 101 can configure the tactile apparatus 101 with, for example, an input device to generate or communicate a certain tactile message, or choose from a list of tactile messages or profiles to determine the type of tactile messages to be communicated. The another user not wearing the tactile apparatus 101 can choose from a list of available tactile messages, using, for example, a pit crew computing device, to communicate a message to a driver to avoid, for instance, auditory communication that can lead to slower lap times. In embodiments in which the controller 110 includes a GPS receiver 308, the controller 110 can take into consideration vehicle's current and past location in determining whether and when to generate particular tactile signals. In some cases, the GPS receiver 308 (or a separate wireless transceiver 112 provided on the controller 110) may be configured to receive location-based signals transmitted by fixed beacons positioned along the racetrack. These signals may enable the controller 110 to more accurately determine the vehicle's position than standard GPS signals.

In an embodiment, choosing from a list of profiles can allow a driver to customize the types tactile messages generated. The profiles can include options to receive only specific tactile messages, for example, such as receiving tactile messages regarding optimum gearshift points and optimum corner entry speeds, but not receiving tactile messages regarding reference points for braking, acceleration, and steering angle. Other profiles can include options to receive tactile messages that are more relevant depending on the driving conditions such a wet or dry conditions and/or practice run versus an actual race. In one embodiment, the driver can change profiles in real time or near real time, at a predetermined time, or at particular time intervals, which may be identical or different. Profiles can help improve performance by, for instance, providing an augmented feel of the car movements during wet conditions when actual feedback of the car's movements is subdued or reduced due to slippery conditions. A wet condition profile can help a driver perform or repeat body controls more accurately and consistently as if driving during dry conditions. In some embodiments, the controller can also be placed into a "learn" mode in which it observes the driver's performance over several laps and then determines (or recommends) the types of cues and other signals to be generated.

In one embodiment, the controller 110 can adaptively fine tune the tactile messages based on an automated assessment of the driver's strengths and/or weaknesses. For example, if the controller detects that the driver is consistently late at performing a particular action (e.g., braking or shifting), the controller may start generating associated tactile cues for performing this action, or may adjust the timing and/or intensity of such cues. Adaptive learning can emphasize certain aspects of training or mitigate a driver's weaknesses during a race. The profiles discussed herein can also include profiles ranging from novice to expert drivers, such as novice, intermediate, advanced, or expert. In one embodiment, a novice profile can include most if not all tactile messages described herein to be communicated to a driver. An expert profile can include counterintuitive tactile messages or tactile messages that help to counteract the particular weaknesses of a driver. An example of a counterintuitive tactile message can be approaching a corner on the racetrack at a slower speed in order to be able to accelerate faster into the following straightaway due to, for instance, more equal weight distribution of a vehicle on all four tires.

Improving Performance

Figure 5:
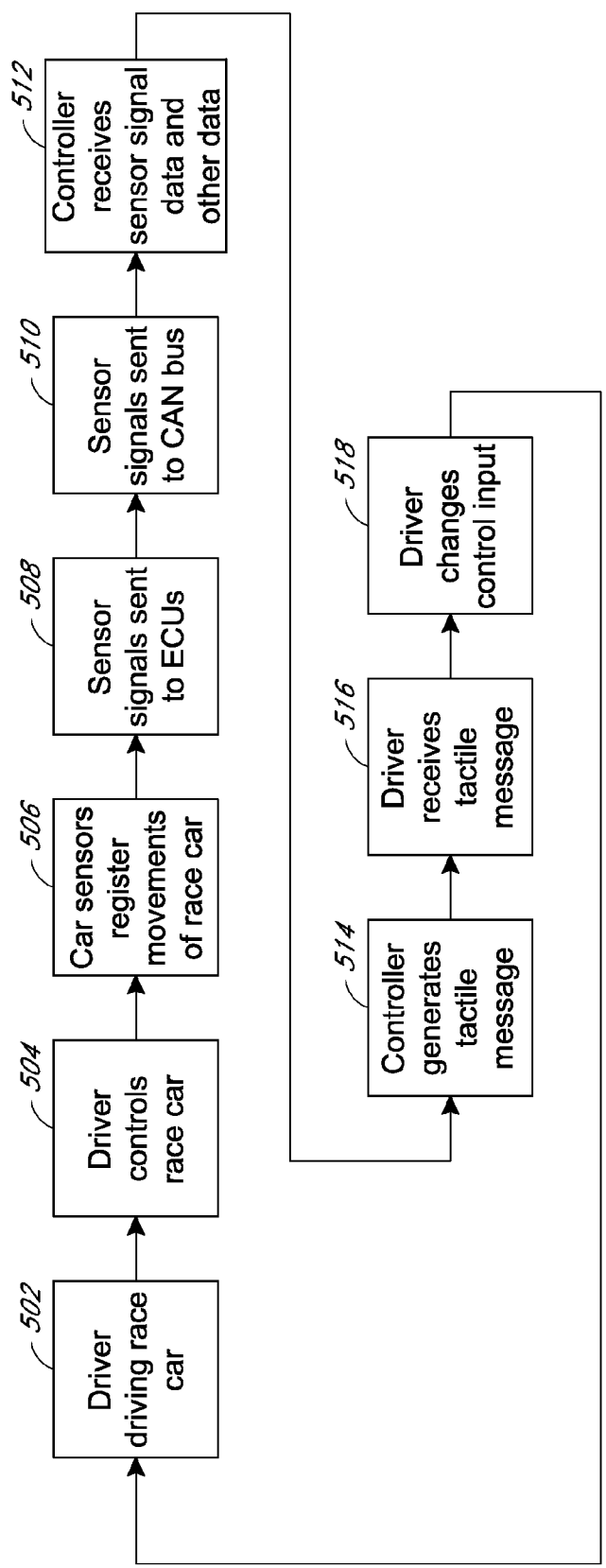
FIG. 5 illustrates an example diagram showing a performance improvement model utilizing a tactile apparatus.

The communication of tactile messages as described herein allows for a driver to learn through conditioning rather than negative reinforcement. In an embodiment illustrated in FIG. 5, a learning cycle is quicker with, for example, a cycle time of 20 milliseconds when compared to the 10 to 20 minute learning cycle time discussed for FIG. 2. At block 502 of FIG. 5, the driver is driving a racecar on a track. At block 504, the driver uses physical body movements or control inputs to maneuver and control the car around the track, particularly during cornering and momentum changes of the racecar such as acceleration and braking. At block 506, the sensors register the movement of the car as induced by the body controls. At block 508, the sensor signals are sent to the electronic control units (ECU) or engine control module (ECM) to control various functions of the car. The sensor, ECU, and/or ECM data is sent on the CAN bus at block 510. At block 512, the controller uses the data being sent on the CAN bus to determine and communicate a tactile message to the driver at block 514. The driver receives the tactile message at block 516 and may in real time change the body control input at block 518 to improve performance. The driver can then immediately repeat the learning cycle starting at block 502 without stopping the racecar and performing the analysis and memory recollection steps described for the blocks 214-226 of FIG. 2.

By sending real time data, a driver can learn and self-correct more accurately and quickly. The driver can immediately respond to a tactile message and quickly learn the effects of changing particular body movements or control inputs on the response of the racecar. The human performance factor of motorsports is still preserved while providing a hypersensitive "feel" of the racecar. As a driver learns and improves over time, the driver may need tactile cues on a less frequent basis.

Figure 6:
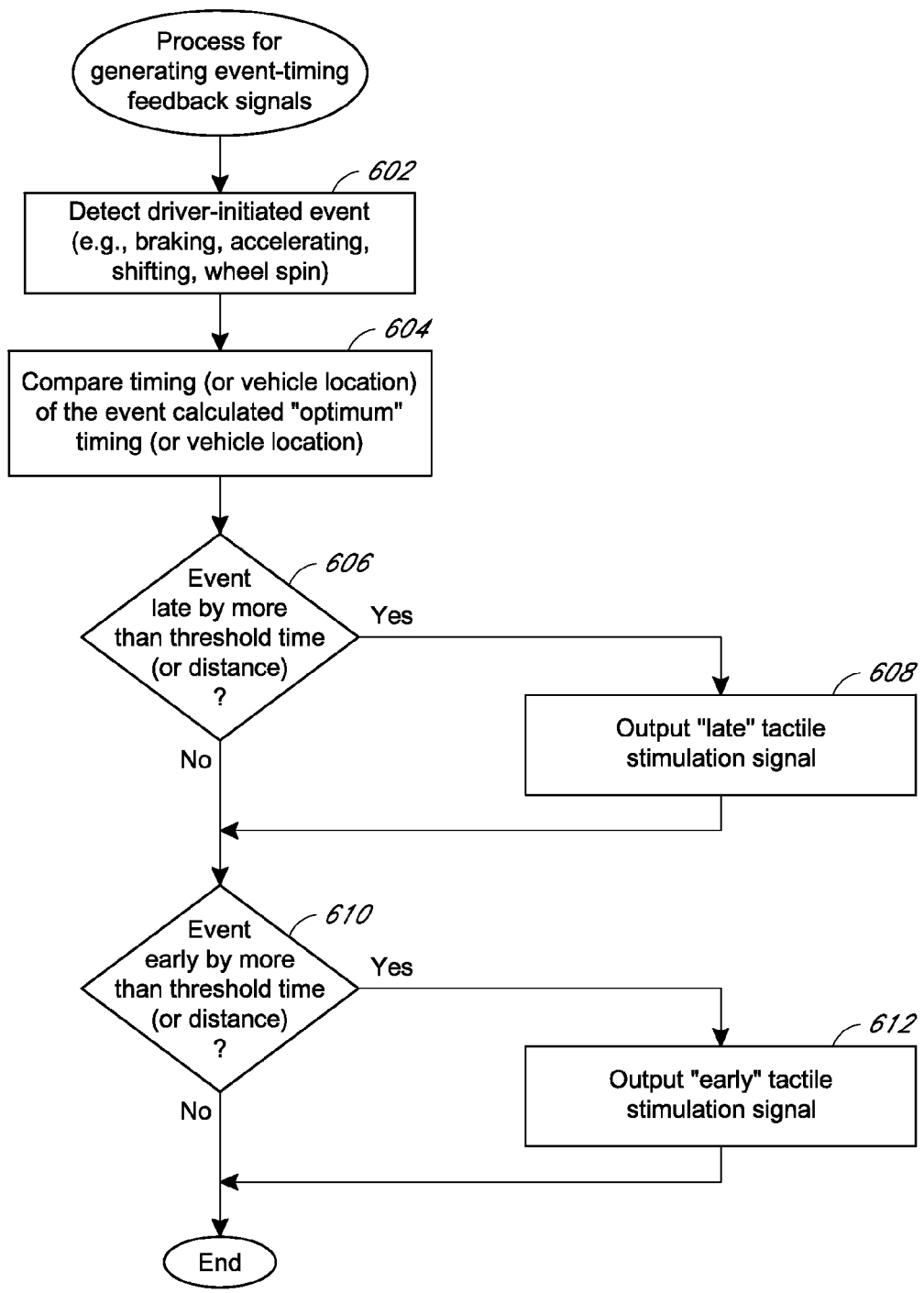
FIG. 6 depicts one embodiment of a process for providing post-event feedback to a driver via tactile signals.

FIG. 6 illustrates a process that may be implemented by the controller 110 to generate tactile feedback signals to notify the driver when certain actions were performed too early or too late. Like the other processes described herein, this process may, for example, be implemented in software or firmware executed by the controller's processor 302. At block 602, the controller 110 detects a driver-initiated event, such as a shifting event, braking event, or acceleration event. At block 604, the controller 110 compares the timing of this event to the "optimum" timing calculated by the controller 110. This optimum timing may be calculated by the controller 110 prior to the event (in which case it may optionally be the basis for a tactile cue signal applied to the driver), or during or after the event. As shown in parenthesis at block 604 and subsequent blocks, the controller may alternatively compare the vehicle's actual location to the calculated optimum location.

As discussed for blocks 606 and 608, if the event was late by more than a selected threshold time (or distance), the controller 110 generates and outputs a "late" tactile stimulation pattern to notify the driver that the action was performed too late. As discussed for blocks 610 and 612, if the event was early by more than a selected threshold time (or distance), the controller 110 generates and outputs an "early" tactile stimulation pattern to notify the driver that the action was performed too early. The controller 110 may vary the magnitudes (or other parameters) of the "early" and "late" signals to convey to the driver the degree to which the action was early or late. As one example, the controller 110 could output a single tactile pulse to represent "early," and two successive tactile pulses to represent "late," with the magnitudes of the pulses being directly proportional to the extent to which the event was early or late. Although not shown in the drawing, the controller 110 could also output a positive feedback signal (e.g., three successive tactile pulses) when the event is performed at the right time. The tactile feedback signals generated through the process of FIG. 6 are typically applied to the driver (e.g., via the vest 114) substantially immediately (e.g., within about 1 second, and more typically within a half second) of the associated driver action.

The threshold or thresholds used for blocks 606 and 610 of FIG. 6 may be programmable by the driver or driver's team via a user interface of the controller 110. The controller's user interface may also enable the driver or driver team to enable and disable various types of feedback signals.

Figure 7:
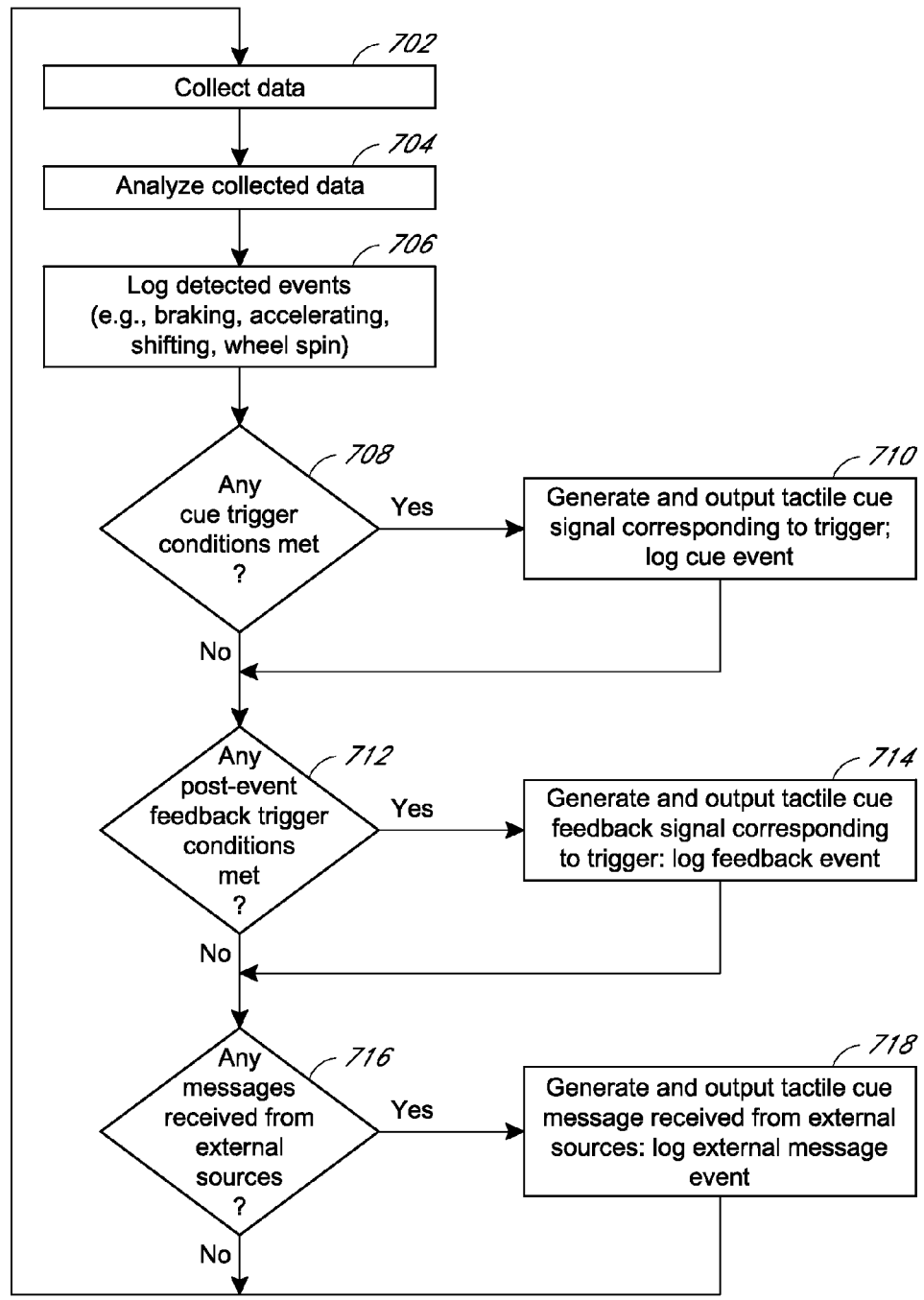
FIG. 7 depicts one embodiment of a process for providing tactile messages to a user.

FIG. 7 illustrates a process that may be implemented by the controller 110 to generate tactile signals or messages based on occurrences of certain events. Like other processes, this process may, for example, be implemented in software or firmware executed by the controller's processor 302. At block 702, data is collected as described herein. For example, the data can be car sensor signal data, or equivalently vehicle sensor information, collected through the CAN bus. The data can include GPS and/or beacon data. The data can also include external sources data, such as, for example, a message from another team member. At block 704, the controller 110 analyzes the collected data to determine appropriate action at decision points 708, 712, and/or 716. At block 706, the controller 110 logs data collected and detected from the sensor signals corresponding to events associated with vehicle information, execution information, and/or auxiliary information as described herein, such as, for example, braking, acceleration, shifting, wheel spin, etc.

At decision point 708, the controller 110 determines whether any cue trigger conditions are met. Cue trigger events can include information relating to real time performance, such as, for example, timing of braking, accelerating, shifting, and cornering, wheel slip, speed, wheel angle, and/or other cue events as described herein.

When a cue trigger condition is met, the controller 110, at block 710, can generate a signal for the tactile apparatus 101 to output as a tactile cue signal corresponding to the cue trigger event. The cue trigger event can be logged in the memory 304 of the controller 110. The cue trigger conditions can be determined based on current sensor signal data, including what the driver is doing in real time, and logged events, at block 706. For example, when the controller 110, based on current sensor signal data, determines that the driver should be braking, but the driver has already braked based on logged event data, the controller 110 can proceed to decision point 712 and determine whether to generate a post-event feedback signal as described herein such as, for example, to let the driver know that the braking was performed too early. As another example, when the controller 110, based on current sensor signal data, determines that the driver should be increasing (or decreasing) acceleration, the controller 110 can determine whether to increase (or decrease) the output of the acceleration tactile cue signal based on the previously generated and logged intensity of acceleration tactile cue signal at block 710. Described differently, as the controller 110 generates and logs an acceleration tactile cue signal, the controller 110 then determines at decision point 708 whether to increase (or decrease) the intensity of the acceleration tactile cue signal based on current sensor data and the logged intensity of the previous or still continuous acceleration tactile cue.

After block 710, or when a cue trigger condition is not met at decision point 708, the controller 110 can determine whether a post-event feedback condition is met at decision point 712. Post-event feedback conditions can include post-event feedback as discussed herein and for FIG. 6. When a post-event feedback condition is met, the controller 110, at block 714, can generate a signal for the tactile apparatus 101 to output as a tactile feedback signal corresponding to the post-event feedback. The feedback event can be logged in the memory 304 of the controller 110. The controller 110 can use logged post-event feedback and current sensor single data to determine, for example, whether generate a tactile post-event feedback signal if an event is continually occurring. When the controller 110 determines that it has already generated post-event feedback based on current sensor data, the controller 110 can instead generate a tactile cue signal to change driver behavior. Accordingly, the controller can use current sensor signal data, logged tactile cue signal events at block 710, and/or logged post-event feedback at block 714 to determine what type of tactile message to deliver. For example, based on a logged tactile cue signal event at block 710, the controller 110 can switch the tactile message to be a post-event feedback signal after determination that the tactile cue signal has already been generated.

After block 714, or when a post-event feedback condition is not met at decision point 712, the controller 110 can determine if a message from an external source has been received at decision point 716. Messages can include a tactile message sent by another member of the racing team and as described herein. When a message from an external source has been received, the controller 110, at block 718, can generate a signal for the tactile apparatus to output a tactile message signal corresponding to the external message. The external message event can be logged in the memory 304 of the controller 110. The controller 110 can use logged external message events to determine when a repeated external message is being received within a predetermined timeframe and suppress the repeated external message to minimize distractions to the driver or prioritize the repeated tactile messages to be later generated again. After block 718, or when an external message has not been received as determined at decision point 712, the process is repeated indefinitely.

The process steps of FIG. 7 do not have to be performed sequentially. The process steps can be carried out in parallel with other steps. The process steps can be carried out by multiple processors in parallel. For example, the controller 110 can be continuously collecting data at block 702 while performing any of the process steps at blocks 704 to 718 such as, for example, while generating any tactile messages at blocks 710, 714, and/or 718. Similarly, the controller 110 can be continuously analyzing collected data while performing any of the process steps at blocks 702 and 706 to 718. The controller 110 can be continuously logging detected events at block 706 while performing any of the process steps at blocks 702 to 704 and 708 to 718.

Accordingly, the controller 110 can make determinations at decision points 708, 712, and 716 at any step in the process described in FIG. 7. The controller 110 can prioritize some tactile messages over others to be generated and delivered to the driver at blocks 710, 714, and 718 based on message type. For example, a tactile cue condition for braking, acceleration, shifting, wheel spin, etc. may be more time critical to the driver than a post-event feedback condition regarding the performance of the tactile cue conditions braking, acceleration, shifting, wheel spin, etc. Thus, the controller 110 can prioritize cue trigger messaging to take place before any post-event feedback messaging when both types of tactile messages are present. (Lower-priority messages that are postponed in this manner can be queued or buffered by the controller, and can be outputted to the driver once no higher priority messages are pending.) Similarly, an external message may be less time critical to the driver than a tactile cue condition and/or post-event feedback condition. The controller 110 can prioritize an external message to be delivered after generating and outputting any tactile cue signals and/or post-event feedback signals. Some postponed messages may become unimportant or irrelevant as a result of the delay, in which case they may be deleted from the queue without being outputted to the driver. In some embodiments, the controller may be capable of outputting two or more concurrent or overlapping tactile messages to the driver, in which case message postponement may be unnecessary. Thus, the controller can use the log of events corresponding to driver action and the log of tactile signal events to determine what type of tactile message to deliver and the priority of the tactile message.

The tactile messages can be prioritized differently. For example, the driver may desire to the first try a racecar maneuver and then receive a tactile post-event feedback message at block 714 based on the performance. The controller 110 can prioritize post-event feedback messages at block 714 over tactile cue messages at block 710 and/or external messages at block 718. The controller 110 can use the logged event data for logged cue signal, post-event feedback signals, and/or external message signals to determine when to deliver the next tactile message. For example, after determining based on logged event data that a post-event feedback message has been generated at block 714, the controller can generate an external message tactile signal at block 718. The controller 110 can suppress tactile cue messages at 710 altogether when the driver desires to receive only post-event feedback at block 714 when trying a racecar maneuver. Accordingly, some process steps described in FIG. 7 can be omitted. For example, the driver may desire not to receive any external messages at block 716, and the controller 110 can prevent the output of any external messages at block 718.

The following are examples of the types of information that can be conveyed to the driver in some embodiments of the system, and of the associated performance improvements that can be achieved. As will be apparent, only a subset of these features may be implemented in some embodiments, and numerous additional types of information can be conveyed beyond those described below.

Wheel Slip/Grip and Related Information Messaging

The vehicle information monitored by the controller 110 can include the measurement of the relationship between the front and rear wheel speeds, which the controller 110 can use to generate a tactile message. The tactile message can create a sense of feel for the relative wheel speeds based on a driver's control input when attempting to maximize acceleration of a car through optimum wheel slip. Control inputs of the driver can include adjusting the relationship between clutch and accelerator positions manually with a real time augmented sense of the effect on the wheel speeds. For example, drivers may feel a gradient cue with varying intensity on their abdomen and/or chest relating to the front wheel speeds. In addition, the drivers may feel a vertical gradient with varying intensity on their back relating to the back wheel speeds. Based on a tactile comparison of the two or more vertical gradient cues relating to the front and back wheel speeds, drivers can optimize wheel slip based on the relative front and back wheel speeds for better acceleration.

Drivers can receive a gradient cue with varying intensity on their right and left torso (abdomen, chest, and/or back) with, for example, the right relating to the front wheel speeds and the left relating to the rear wheel speeds. Based on a tactile comparison of the two or more gradient cues with varying intensity relating to the front and back wheel speeds, drivers can optimize wheel slip based on the relative front and back wheel speeds for better acceleration. In other embodiments, a tactile message can be a square pattern, with the four corners of the square relating to a particular wheel speed that is communicated through varying intensity or frequency of the vibration.

In certain embodiments, drivers will not receive a tactile message until the relative speed between the front and back wheels is such that wheel slip is optimum or alternatively, not optimum. A tactile message can, for example, consist of a particular one or a combination (such as a square pattern) of activators 116 vibrating when optimum wheel slip is present or not present. Thus, drivers can be notified when maximum acceleration can be achieved or not achieved. Not receiving a tactile message until the point in time of maximum acceleration (or lack thereof) can increase the ability to communicate other tactile messages that may be more relevant during certain driving situations.

The vehicle information monitored by the controller 110 can include wheel slip relative to the surface of travel. A car can have an optimum wheel slip point during braking and/or deceleration such that the wheels rotating slower than the surface they are travelling over maximizes the deceleration of the car. Similarly, a car can have an optimum wheel slip point during acceleration such that the wheels rotating faster than the surface they are traveling over maximize the acceleration of the car. Further, a car can have an optimum wheel slip or grip point in cornering situations such that wheels slip slightly at the corner to maximize grip and cornering ability. A tactile message can communicate to the driver an optimum wheel slip or grip being achieved in real time and the driver can immediately adjust the car's controls accordingly. For example, drivers can receive a gradient cue with varying intensity on their torso (abdomen, chest, and/or back) relating to the wheel slip relative to the surface of travel. The wheel slip for each individual wheel can be communicated through a tactile message to different parts of the torso as described for front and back wheel speeds, such as front, back, left, and/or right parts of the torso relating to a slip of a particular wheel of a vehicle. The gradient level and/or intensity of the tactile message can increase as a particular wheel slips more relative to the surface of travel.

Based on a tactile cue indicating the wheel slip, drivers can adjust control inputs to optimize the wheel slip for more grip of the tire during deceleration, acceleration, and/or cornering. In other embodiments, a tactile message can be a square pattern, with the four corners of the square relating to a particular wheel slip that is communicated through varying intensity or frequency of the vibration.

In certain embodiments, drivers will not receive a tactile message until the relative speed between the front and back wheels is such that wheel slip is optimum or alternatively, not optimum. A tactile message can, for example, consist of a particular one or a particular combination (such as a square pattern with corners relating to particular tires) of activators 116 vibrating when optimum wheel slip is present or is not present. Thus, drivers can be notified when maximum deceleration, acceleration, and/or cornering can be achieved or not achieved. Not receiving a tactile message until the point in time of maximum deceleration, acceleration, and/or cornering (or lack thereof) can increase the ability to communicate other tactile messages that may be more relevant during certain driving situations.

The vehicle information monitored by the controller 110 can include brake line pressure to further maximize deceleration through the achievement of optimum wheel slip. Brake line pressure achieved through the effort applied to the brake pedal can be the primary means of decelerating a vehicle. An optimum brake line pressure can be at a point right up to which a wheel lock up would be likely. Brake line pressure achieving the point right before wheel lock up can help optimize wheel slip during deceleration as described herein. A tactile message can communicate to the driver the optimum possible brake line pressure and real time feedback about how quickly it is achieved. Furthermore, the brake line pressure can waver under braking when, for instance, "heel to toe" braking can be required to match engine RPM while downshifting gears as described herein. The changing brake line pressure can be communicated to the driver in real time with, for example, a gradient cue with varying intensity on a driver's torso (abdomen, chest, and/or back). The changing brake line pressure can replace or supplement the wheel slip tactile messages for each individual wheel described herein.

Based on a tactile cue indicating brake line pressure, drivers can adjust control inputs to optimize the brake line pressure for more grip of the tire during deceleration and/or cornering. In certain embodiments, drivers will not receive a tactile message until the brake line pressure is optimum or alternatively, not optimum. When the tactile messages are communicating optimum brake line conditions, drivers can maintain the current optimum brake line achieved. Not receiving a tactile message until the point in time of optimum brake line pressure (or lack thereof) can increase the ability to communicate other tactile messages that may be more relevant during certain driving situations.

The vehicle information monitored by the controller 110 can include transitional input ramps. To maximize grip of the vehicle tires on the track, a driver can make relatively small transitional inputs into the steering, acceleration, and/or braking controls. The transitional inputs to the controls can result in "ramps" between zero and 100% of utilization of the available tire grip. The ramps resulting from the control inputs can mitigate jolts from the vehicle changing direction. A tactile message can communicate to the driver the ramps between zero and 100% and augment any resulting jolts of the car. The amplification of jolts can aid the driver in correcting control inputs for a smoother transition from zero to 100% utilization of available tire grip under, for instance, braking and/or cornering. Better utilization of the available tire grip can result in better direction changes and reduced cornering times. For example, drivers can receive a gradient cue with varying intensity on their torso (abdomen, chest, and/or back) relating to the ramps between zero and 100%. The ramps tactile messages can replace or supplement the wheel slip tactile messages for each individual wheel described herein. In certain embodiments, a tactile message can be a square pattern, with the four corners of the square relating to a particular ramp for each wheel that is communicated through varying intensity or frequency of the vibration.

In certain embodiments, drivers will not receive a tactile message until the ramps are no longer smooth and/or results in jolts of the car. A tactile message can, for example, consist of a particular one or a particular combination (such as a square pattern with corners relating to particular tires) of activators 116 vibrating when optimum wheel grip is lost based on the ramp input, resulting in jolts of the car. Thus, drivers can be provided feedback on their ramp inputs to help condition optimum use of the tire grip. Not receiving a tactile message until the point in time of unsmooth ramps and/or resulting jolts of the car can increase the ability to communicate other tactile messages that may be more relevant during certain driving situations.

The auxiliary information monitored by the controller 110 can include tire wear. A driver should balance short term performance of the tire against long term benefits of prolonging tire life to match a race strategy. The race strategy can include plan to minimize pit stops by prolonging tire life. Certain driving techniques can sacrifice immediate speed in order to prolong tire life, which can lead to time saved over an entire race when any time lost due to slower speeds is less than the time that would have been lost with extra pit stops to change tires. Thus, the optimum wheel slip and grip points described herein can be balanced with tire life to achieve an overall better race result, not just an immediate improvement of acceleration, deceleration, and/or cornering. A tactile message can communicate to the driver re-affirming cues based on certain driving techniques by, for instance, placing a predictive value on the remaining tire life. For example, drivers can receive a gradient cue with varying intensity on their torso (abdomen, chest, and/or back) relating to the remaining tire life. The gradient can increase, decrease, or change in intensity as the remaining tire life changes throughout racing or training. The tire life tactile message can either be a constant tactile cue, or communicated at certain time intervals or reference points during racing or training. The tire life for each individual wheel can be communicated through a gradient cue with varying intensity to different parts of the torso as described for front and back wheel speeds, such as front, back, left, and/or right parts of the torso. The tactile message can be a square pattern, with the four corners of the square relating to a particular tire life that is communicated through varying intensity or frequency of the vibration.

Based on a tactile cue indicating the tire life, drivers can adjust control inputs to optimize the wheel slip for more grip of the tire during deceleration, acceleration, and/or cornering to prolong the tire life if such a race strategy is desired. Conversely, a tactile message toward the end of racing or training indicating that more tire life remains than anticipated, the driver may drive more aggressively toward the latter part of the race or training session.

In certain embodiments, drivers will not receive a tactile message until the tire life is below a predetermined threshold, communicating to the driver an approximate run time before a pit stop is required. Further, drivers can receive a tactile message providing feedback when the driver maneuvers the car to decrease tire life beyond a predetermined threshold for a completed lap, a particular segment of the racetrack, and/or a particular maneuver such as at a particular corner. Not receiving a tactile message until the point in time of deviation of the remaining tire life from a predetermined tire life can increase the ability to communicate other tactile messages that may be more relevant during certain driving situations.

The vehicle information monitored by the controller 110 can include fuel consumption, which along with tire life information, can be utilized to match a race strategy. A driver should balance short term car performance that possibly consumes more fuel against long term benefits of decreasing fuel consumption to match a race strategy of, for example, minimizing pit stops. Even small changes in steering angle and throttle position can affect the fuel consumption. Steering angle and throttle position can replace or supplement wheel slip/grip and/or transitional input ramps information described herein to determine immediate or long term fuel consumption. A tactile message can communicate to a driver when deteriorating fuel consumption control inputs are detected and help reinforce more fuel efficient control inputs. For example, drivers can receive a gradient cue with varying intensity on their torso (abdomen, chest, and/or back) relating to the remaining fuel. The gradient can increase, decrease, or change in intensity as the remaining fuel changes throughout racing or training. The remaining fuel tactile message can either be a constant tactile cue, or communicated at certain time intervals or reference points during racing or training.

A tactile message can communicate feedback to the driver when the steering angle and throttle position is not optimum, resulting in excessive fuel consumption. Based on the tactile cue indicating fuel consumption in real time, such as an increasing gradient level as fuel consumption increases during a maneuver, drivers can adjust control inputs to optimize the steering angle, throttle position, wheel slip/grip, and/or transitional input ramps to decrease fuel consumption if such a race strategy is desired. Conversely, a tactile message toward the end of racing or training indicating that more fuel remains than anticipated, the driver may drive more aggressively toward the latter part of the race or training session.

In certain embodiments, drivers will not receive a tactile message until the fuel is below a predetermined threshold, communicating to the driver an approximate run time before a pit stop is required. Further, drivers can receive a tactile message providing feedback when the driver maneuvers the car to increase fuel consumption beyond a predetermined threshold for a completed lap, a particular segment of the racetrack, and/or a particular maneuver such as at a particular corner. Not receiving a tactile message until the point in time of deviation of the remaining fuel from a predetermined fuel life can increase the ability to communicate other tactile messages that may be more relevant during certain driving situations. In other embodiments, a tactile apparatus 101 directed to minimizing fuel consumption as described herein can be utilized in everyday commuter transportation or other professional driving fields, such as cargo transportation with large trucks.

Gearshift Messaging

The monitored vehicle information monitored by the controller 110 can include the engine revolutions per minute (RPM). To utilize all available engine power for maximum acceleration, a driver can manually shift gears at the latest point. If the driver selects a gear too late, the rev limit engages, which limits the RPMs of the engine. With the rev limit engaged, acceleration is reduced. If the driver selects a gear too early, acceleration is also compromised by less than optimum use of available engine torque. A tactile message about the optimum gearshift points can replace or supplement the visual or auditory cues a driver normally uses for gear shifting. The tactile message can, for instance, utilize a tactile cue conveying a gradient sense up and down the driver's body as described herein. For example, drivers may feel a gradient cue with varying intensity on their torso (abdomen, chest, and/or back). Once the gradient reaches a predetermined level and/or intensity, the drivers are notified of the optimum gearshift point. In certain embodiments, drivers will not receive a tactile message until the optimum gearshift point is present. Not receiving a tactile message until the point in time of an optimum gearshift can increase the ability to communicate other tactile messages that may be more relevant during certain driving situations.

A tactile message can communicate feedback to drivers on whether an optimum gearshift point was executed. For example, the tactile message may communicate a gradient cue with varying intensity on their torso (abdomen, chest, and/or back) with the gradient level being higher or more intense as a driver performs a gearshift farther away from an optimum gearshift point. Thus, achievement of an optimum gearshift point may be a single activator 116 vibrating after the gearshift, confirming the achievement of the optimum gearshift point to the driver.

Optimum gearshift points can also be utilized during deceleration. Maximizing the engine RPMs while downshifting gears in braking situations can help decelerate a car. The selected gear should match the wheel speed of the car with the optimum engine RPM to help avoid compression lock up and engine damage through excessive engine RPM that can be generated by an imposed high wheel speed. A tactile message can communicate to the driver an optimum relationship between the wheel speed, engine RPM, and gear to be selected. For example, drivers may feel a gradient cue with varying intensity on their abdomen and/or chest relating to the wheel speeds. In addition, the drivers may feel a vertical gradient with varying intensity on their back relating to the current RPMs. At another place on their torso, the drivers can be notified of an optimum engine RPM based on a gradient cue with varying intensity along with what gear will achieve the optimum engine RPM relative to the present wheel speed (s). The choice of gear can be communicated through a sequential vibration of the activators 116 in a linear fashion along the torso, with the first activator 116 indicating the first gear, the second activator 116 indicating the second gear, etc.

Based on a tactile comparison of the two or more gradient cues with varying intensity relating to the RPMs and the wheel speed(s), drivers can optimize deceleration by matching wheel speeds with optimum RPM through a selection of a tactilely indicated optimum gear. In certain embodiments, drivers will not receive a tactile message until the relative wheel speed(s) matches an optimum engine RPM that would be achieved based on a next gearshift down (e.g., from fourth to third gear). A tactile message can, for example, consist of a particular one or a particular combination (such as a square pattern) of activators 116 vibrating when optimum RPMs relative to the wheel speed(s) is present. Thus, drivers can be notified when maximum deceleration can be achieved. Not receiving a tactile message until the point in time of maximum deceleration or optimum match of wheel speeds to RPM can increase the ability to communicate other tactile messages that may be more relevant during certain driving situations.

The controller 110 can monitor actual RPM and rate of RPM change to provide a tactile message that indicates rate of approach to a gear shift point as well as the gear shift point itself. The controller 110 can monitor wheel speed from all four wheels to identify wheel spin and provide a tactile message that assists with power management (e.g., braking, deceleration, acceleration, etc.) during starts and exits from turns and/or corners.

Reference Points Messaging

The auxiliary information can include reference points on a racetrack including for braking (deceleration), steering angle, acceleration, wheel slip/grip, tire life, and/or fuel consumption, and vehicle location, which can be based on input from a global positioning system. A driver can learn a racetrack and can look for visual markers on where, for instance, a latest or optimum braking point is on the racetrack. A tactile message can communicate the same visual cues more precisely as reference points based on vehicle location. A tactile system can be configured based on an input of known GPS coordinates of optimum reference points. In other embodiments, the tactile system may support the ability for a driver to inform the system of particular locations to be used for generating certain types of cues. The system can be placed into a configuration mode in which the driver circles the track and marks specific locations (such as by pressing a button on the vest). The controller 110 can log the coordinates (GPS and/or field sensor/beacon based) to be used for generating reference point tactile messages as described herein. The coordinates can be adjusted as needed if, for instance, the driver may have been mistimed entering an optimum reference point. Further, the tactile system can shift those reference points based on a desired race or training strategy as described herein such as prolonging or decreasing tire life and/or fuel consumption. The shift in race strategy can occur in real time during racing or training such as when the tactile system determines that more tire life and fuel remains than needed at a particular reference point.

In some embodiments, a tactile message can communicate progressive information to help the driver anticipate an approaching reference point. A tactile message can also communicate to the driver an optimum point to release the brake and/or release the gas pedal. For example, drivers can receive a gradient cue with varying intensity on their torso (abdomen, chest, and/or back) relating to an approaching reference point. The gradient can increase, decrease, or change in intensity as the reference point approaches or passes based on vehicle location.

A tactile message can communicate feedback to the driver whether the optimum braking (deceleration), steering angle, acceleration, wheel slip/grip, tire life, and/or fuel consumption at a particular reference point was achieved. For instance, particular set of activators 116 may be activated in a linear fashion to indicate by how many fractions of a second or whole seconds that driver missed the reference point to make the optimum control input.

When the auxiliary information can include reference points on a racetrack for a steering angle, a driver can learn a racetrack and can look for visual markers on where, for instance, to take a particular steering angle into a corner. A tactile message can communicate the same visual cues on when to take a steering angle more precisely as reference points based on vehicle location. A tactile message can also communicate if the driver is under steering or over steering at a particular reference point. A tactile message communicating reference points for a steering angle and/or over or under steering can help optimize cornering abilities and save time. For example, drivers can receive a gradient cue with varying intensity on their torso (abdomen, chest, and/or back) relating to an approaching reference point and an optimum steering angle. The gradient can increase, decrease, or change in intensity as the reference point approaches or passes based on vehicle location. Further, a different tactile gradient cue can increase, decrease, or change in intensity as the driver turns the steering wheel in a particular direction communicating any deviation from an optimum steering angle.

A tactile message can communicate feedback to the driver whether the optimum steering angle at a particular reference point was achieved. For instance, particular set of activators 116 may activate in a linear fashion to indicate by how many degrees the driver missed the desired steering angle.

When the auxiliary information can include reference points on a racetrack for acceleration, a driver can learn a racetrack and can look for visual markers on where, for instance, an earliest or optimum acceleration point is on the racetrack. A tactile message can communicate the same visual cues for acceleration more precisely as reference points based on vehicle location. In some embodiments, a tactile message can communicate progressive information to help the driver anticipate an approaching reference point for acceleration. A tactile message can also communicate to the driver an optimum point to stop accelerating. For example, a tactile gradient cue can increase, decrease, or change in intensity as the driver changes or maintains a certain acceleration at a particular reference point, communicating any deviation from optimum acceleration.

A tactile message can communicate feedback to the driver whether the optimum acceleration at a particular reference point was achieved. For instance, particular set of activators 116 may activate in a linear fashion to indicate by how much the actual speed of the car is different from an optimum speed that could have been achieved based on an optimum acceleration from a particular reference point. The tactile message communicates to the driver whether acceleration was too high or too low from the particular reference point.

The auxiliary information can include reference points on a racetrack to notify a driver of an approaching corner. A tactile message can communicate a reference points for approaching corners by surveying a course before a race event and configuring the tactile system as described herein. Notifying the driver of an approaching corner can be useful for blind corners, long stage races such as a Road Rally race where a driver's memory is inaccurate, and/or nighttime racing where visibility can be poor. For example, drivers can receive a gradient cue with varying intensity on their torso (abdomen, chest, and/or back) relating to an approaching corner. The gradient can increase, decrease, or change in intensity as the car nears the approaching corner. Another gradient cue with varying intensity on the torso can communicate the angle of the approaching corner by increasing the gradient cue in length or intensity. In certain embodiments, the tactile system can combine approaching corners information with reference point information for braking (deceleration), steering angle, acceleration, wheel slip/grip, tire life, fuel consumption, and/or weight distribution to improve and optimize performance.

The execution information can include time gain or loss from reference laps and/or from reference points. Data available in a data logger and/or input available from a global positioning system can be utilized to log a reference lap or sector time. Sectors can be reference markers placed along a racetrack, splitting the racetrack into predetermined segments. A tactile message can communicate to a driver time gain or loss from reference laps and/or from reference points in real time. The tactile message can allow a driver to know in real time how a self-correction or a new technique affects a lap or sector time. Either with or without GPS input, the controller 110 can monitor distance traveled from a reference point and/or start line to determine the position of the car to, for example, compare a reference lap to a new lap. For example, drivers can receive a gradient cue with varying intensity on their torso (abdomen, chest, and/or back) relating to a reference time at a particular reference point. A particular set of activators 116 may be activated in a linear fashion to indicate by how many fractions of a second, whole seconds, and/or minutes that driver is ahead or behind on time at a reference point.

Messaging Regarding Relative Positions of Nearby Cars

A racecar can include sensors that can sense the relative position and change in position (trajectory) of a nearby racecar on the track. Sensors can be located on the front, back, or sides of the racecar. In some embodiments, the controller 110 can determine the position and change in position of a nearby racecar(s) based on data received from GPS and/or beacons configured to track movements of the racecars.

The controller 110 can be configured to receive the sensor signal data corresponding to the position and/or change in position of a nearby racecar and to convey this message to the driver via one or more tactile messages. For example, when a racecar is nearby, a particular tactor in the tactile apparatus 101 can activate. When the nearby racecar changes position relative to the driver's racecar, the tactile signal may increase in intensity as the nearby racecar approaches or may decrease in intensity as the nearby racecar moves away.

For example, the driver may feel a gradient cue with varying intensity on their abdomen and/or chest relating to nearby racecars in front of the driver's racecar. The driver may feel a vertical gradient with varying intensity on their back relating to the nearby racecars in back of the driver's racecar. Similar principles can be applied regarding nearby racecars on the sides of the driver's racecar. The controller 110 may additionally or alternatively detect that a nearby racecar is attempting to pass and may immediately convey this information to the driver.

The controller 110 can alter performance-related tactile messages as described herein based on the position of a nearby racecar. For example, when the nearby racecar is in front of the driver's racecar, the controller 110 can alter the tactile cue message regarding optimum acceleration such as decreasing the rate of acceleration. As another example, the controller 110 can determine the optimum steering angle and acceleration to maximize the possibility of passing the nearby racecar. Similarly, the controller 110 can determine how to alter optimum braking, timing of gear selection, entry and exit speeds, and/or entry and exit lines tactile messages based on the position and change in position of the nearby racecar. The altered tactile messages can, for example, help avoid an accident if the unmodified queued tactile message was communicating a trajectory that would have caused the driver to collide with the nearby car.

The controller 110 can alter the post-event feedback messages based on position and change in position of a nearby racecar. For example, the controller 110 can generate a post-event feedback message indicating whether the driver took proper action to pass the nearby racecar.

Other Racecar Tactile Messaging and Uses

The vehicle information monitored by the controller 110 can include a weight distribution across four tires of the car. Acceleration can be optimized when the weight distribution of a vehicle is more equal across four wheels of the vehicle. A tactile message can communicate to the driver an augmented sense of the weight distribution of the vehicle across the four wheels to replace or supplement a sense of weight distribution the driver may already have based on a roll of the vehicle. Communication of the weight distribution of the vehicle can help correct any driver tendency to not value the weight distribution in vehicle performance. For example, drivers can receive a varying intensity tactile cue on their torso in the shape of a square with each corner correlating to the weight distributed on a particular wheel. The intensity can increase, decrease, or change as weight placed on each wheel changes. Weight distribution can also be communicated with a gradient cue with varying intensity on the torso (abdomen, chest, and/or back) relating to the weight placed on each wheel. There can be four gradient cues correlating to each wheel of the car that increase, decrease, or change in intensity as the weight placed on each wheel changes.

The weight distribution tactile message can either be a constant tactile cue, communicated at certain time intervals or reference points during racing or training, and/or communicated when the weight distribution on a particular wheel exceeds a predetermined amount. Not receiving a tactile message until the point in time of deviation of the weight distribution from a predetermined weight distribution can increase the ability to communicate other tactile messages that may be more relevant during certain driving situations. In another embodiment, the tactile message communicating the weight distribution as described herein can be reproduced on a training simulator to replace or supplement throwing the driver around to mimic steering into a corner.

The controller 110 can utilize a control theory concept of observability to estimate data that cannot be sensed directly from sensors on a car because of regulations or cost of direct sensors. The control theory concept of observability can be a mathematical software model of the vehicle. The observer model of the vehicle can be used to estimate the optimal steering angle in a turn and/or a corner from GPS location data, wheel speeds, and/or accelerometer data with or without a gyro. The observer model of the vehicle can predict impending wheel lock up during braking (before the wheels actually lock) to allow the driver an opportunity to modulate braking forces for optimal performance. The observer model of the vehicle can also incorporate environmental data such as track maps, rain sensors, and/or temperature probes to adjust the tactile cues for the current race conditions.

The tactile message can relate to a quality of the data being communicated. For example, left rear wheel spin can appear on the left side of the driver's back. A gear shift point (for a left hand drive vehicle) can rise along the driver's right side as the RPM approaches the optimum shift point. Lap time gain or loss can appear on the driver's back or front (respectively) at multiple points around the track. The tactile device 101 can communicate a spatial cue by changing the physical location of the tactile message. The tactile device 101 can communicate different channels of data (similar to different tones or colors) and/or magnitude or urgency by changing a frequency and/or rate of the tactile message.

A tactile vest or other tactile apparatus 101 can be worn by a passenger, such as a student, as a training tool. While a driver or instructor is maneuvering a vehicle, the passenger can experience an augmented sense of the vehicle movements and operating parameters as described herein in response to the instructor's control inputs, which can be useful to demonstrate a technique the instructor is teaching. As another example, the passenger can be an engineer assessing the vehicle's movements based on the driver's control inputs. The engineer can use tactile messages as described herein to, for instance, fine tune and/or customize the vehicle's responses to a driver's input or test an effect on the vehicle's response based on a mechanical and/or electronic modification to the vehicle. Further, the driver can use a tactile apparatus when reviewing data in a simulator or on a screen to aid in improvement analysis as described for FIG. 2. The engineer can use a tactile apparatus when reviewing data in a simulator or on a screen to aid in corrective engineering. Wearing a tactile apparatus while reviewing data in the data logger can aid the driver in remembering the vehicle's response based on the driver's control inputs. Similarly, wearing a tactile apparatus can aid the engineer in understanding the vehicle's response based on the driver's control inputs and any vehicle mechanical and/or electronic modifications. A tactile vest or other tactile apparatus 101 can be worn by engineers and other team members (e.g., other team drivers) at a remote location (e.g., team garage) to receive the same tactile messages wirelessly in real time as being received by the driver of the car on the racetrack. Engineers and other team drivers receiving the same tactile message in real time can further help develop engineering solutions, such as during time critical testing, and also can allow the other team drivers to simultaneously experience the behavior of the car to offer an informed alternative opinion for performance improvement.

The auxiliary information can include pit crew information. Pit crew information includes information that optimizes pit stop efficiency and improves pit stop safety with tactile apparatuses worn by pit crew members. A tactile message can communicate to individual pit crew members the status of the other pit members' functions such as when will the vehicle's fuel tank be full in order to properly time changing of the tires to be ready at the same time. Correspondingly, a tactile message can communicate to individual pit crew members the status of their own functions such as fuel feed or tension on an air gun when tightening a wheel. For example, pit crew members can receive a gradient cue with varying intensity on their torso (abdomen, chest, and/or back) relating to a particular pit crew function such as the gradient increasing as the fuel tank fills with fuel or as tension on an air gun increases. A plurality of gradients on the torso can correspond to the different pit crew functions being communicated in real time. A specific activator 116 can be correlated with a particular pit crew function and activated depending on the function being communicated to the pit crew member. The pit crew members can receive tactile messages relating all pit function available or can toggle through the available tactile messages with, for example, a switch attached to the tactile apparatus. A tactile message can also assist the car's controller to safely and efficiently release the car into a pit lane.

Yacht Racing Applications

A tactile apparatus 101 can be used to improve yacht racing performance. Yachts can include any boat or vessel for traveling on water, including vessels ranging from a dinghy class through a large yacht used for events such as America's Cup match races. The yacht can be a single or multi-hulled vessel. The yacht can be propelled by wind, such as when sailing. The capture of wind energy can be by sail, wing sail, and/or wing. A tactile apparatus 101 can be used to improve performance, including provide cues related to what tasks are to performed, provide cues related to adjustments of yacht control inputs, provide cues related the order of tasks to be performed, warn of in an impending event, provide information related to the position of nearby yachts, provide information related to sailing conditions, act as a safety aid, and/or other suitable uses that can be conveyed via a tactile message.

The tactile apparatus 101 for a yacht racing can function substantially the same and have substantially the same components as described herein for motorsports. A tactile apparatus 101 can have substantially the same controller 110 and control schemes as described herein. The controller 110 can have a memory 304. The memory 304 can have program code 306 that the controller 110 can draw upon as a database of for specific tactile outputs based on the yacht-related information. The program code 306 can implement the algorithms and program logic for performing the various functions described herein, including the analyzing of yacht-related information and the generating of tactile messages to be conveyed via a vest worn by a user. The tactile apparatus 101 can have a wired and/or wireless transceiver to receive information related to the yacht's operation and sailing condition. Any one or more crewmembers on the yacht can wear a tactile vest (or other tactile device) that can include a wireless transceiver to, for example, receive messages over a wireless network and/or broadcast the vest's position. The tactile apparatus 101 can have a user-interface for selecting when and what types of tactile messages are to be delivered. The user-interface can allow for a selection of certain crewmember to receive a selection of certain types of tactile messages.

In competitive sailing or yacht racing, a crew comprising crewmembers, such as a skipper and sailor(s), maneuvers the yacht to maximize performance given certain sailing conditions. Sailing conditions can include wind direction, wind strength, sea state (e.g., waves and swell), and/or tide (e.g., currents induced by the rise and fall of sea level). The crew will maneuver the yacht to convert available wind energy into momentum in a desired direction. Control inputs to control the progress and direction of the yacht can include tiller/wheel position, sail trim (e.g., outhaul, Cunningham, boom yang, sail sheet positions), disposition of the yacht (e.g., amount of lean), and/or position of the crew (e.g., weight distribution on the yacht). Once the yacht is moving in a desired direction, the crew can manipulate control inputs to maximize the use of the available wind energy while minimizing losses that can result from, for example, incorrect yacht and/or sail angle.

During competitive sailing or yacht racing, a sailor can be subjected to environmental elements and movement of the boat, which can make it difficult to concentrate on data readers. Data readers can provide sailing information such as performance indications of the yacht during sailing. A tactile apparatus 101 can be used to convey to a sailor messages related to the data readers to help optimize yacht performance as described herein.

A crewmember can be expected to perform or may be responsible for multiple tasks. In particular, a skipper and a tactician may have the most performance indicators received via tactile messages to continuously yacht performance. The controller 101 can be configured to allow a sailor to group the tactile cues into groups (or categories). For example, the sailor may choose to receive group(s) of information via tactile messages while continuing to monitor other group(s) of information through data readers. In competitions with a limited number of crewmembers (e.g., a racing team can consist of a single person on board the yacht during competition), the sailor can alternate between single or groups of tactile messages depending on the sailing conditions, yacht direction, yacht location on the course, etc.

The controller 101 can be configured to group sailors into groups. For example, a skipper and a tactician can be one group that receives most or all of the tactile messages available to improve the performance of the yacht, such as, for example, warning of in an impending event, cues regarding the order of tasks to be performed, information related to the position of nearby yachts, and/or information related to sailing conditions. The skipper can choose to receive tactile messages related to direction of the yacht, yacht speed, lay line (most efficient point to make a turn), and/or course/field out of bounds warnings. Other groups of sailors can receive a specific group, category, and/or type of information related to performance, such as, for example, cues regarding the order of tasks to be performed. For example, the main trimmer can receive tactile messages related to lean of the yacht. Yacht lean can be particularly useful information in boat racing events such as America's Cup where the objective can be to have one hull of the yacht out of the water, but not tip the yacht over.

The controller 110 can include a master switch that stops or suppresses some or all tactile messages. The master switch can be used to stop all tactile messages when the tactile messages could distract crewmembers from their tasks. For example, the yacht may end up in the position where it will not make a turning point if the yacht operation is continued in an efficient matter. The crew may have a choice of putting in an extra two tacks or to drive the boat at a sub optimal speed to gain enough distance around the turning point without making extra tacks. The momentum of the yacht may be sufficient that continuing in a less efficient direction, but avoiding extra tacks, may be a faster course path than the optimal direction. During this procedure (may be known as "pinching"), tactile messages related to optimal operation of the yacht may be distracting and unnecessary since the crewmembers will be consciously driving the yacht in a suboptimal manner.

The master switch can be used to have the controller 110 stop or suppress some or all of the tactile messages. Some tactile messages that the crewmembers may continue to receive even with the master switch activated to suppress tactile message can include information related to safety as described herein. The master switch can be manually activated and/or deactivated. In some embodiments, the master switch can be manually activated and automatically deactivate after the yacht passing a specific reference point or after a predetermined amount of time has elapsed. In some embodiments, the master switch can automatically activate when the controller 110 determines that a procedure such as "pinching" is being performed.

The controller 110 can monitor sensors that may already exist on the yacht. The data readers displaying information from sensors can include sailing information, such as, for example, yacht speed, yacht direction, yacht location, disposition of the yacht, tiller/wheel position, and/or sail trim. Sail trim can include, for example, sail position of the outhaul, Cunningham, boom yang, and/or sail sheet position. Disposition of the yacht can include, for example, lean of the yacht. In operation, the captain will set a course and the crew will then aim to maximize the yacht speed by adjusting the trim of the sails. For a given wind speed and direction with a particular yacht heading (direction of progress), the controller 101 can generate a tactile message to convey an ideal sail trim for a particular tiller position. The controller 101 can alter a tactile message related to ideal sail trim based on the sea state. The controller 101 can adjust the tactile message to be delivered based on parameter inputs related to yacht design. For example, yacht designs may make trade-offs such as designing the yacht to be faster in a particular sailing direction. A yacht can be designed to be faster downwind than upwind. As another example, a yacht design may dictate how closely to the wind line the yacht can sail upwind.

The controller 110 can monitor the progress of the tasks of each crewmember through the yacht sensor data indicating the current settings (e.g., tiller, sail trim). If a crewmember omits a step in the process and/or fails to complete the process to optimize the performance of the yacht as described herein, the controller 110 can generate a tactile message as a reminder to the crewmember to complete the step in the process in real time before the crewmember moves onto the next step and/or to complete the task in progress before proceeding to the next task (e.g., next duty to be performed by the crewmember).

The tactile apparatus can be used to silently communicate to the entire crew a change in sailing strategy. In competitions where the yachts are in close quarters and commands from the skipper can be overheard by a competing team, the skipper can use the tactile apparatus to command the controller 110 to generate a tactile message that silently indicates either a series of commands or a change in strategy to all crewmembers or a selector group(s) of crewmembers.

Examples of Yacht Racing Applications—Helmsman Messages

Similar to applications to motorsport racing, a tactile apparatus can be used to optimize the performance of a yacht's crew during training, racing, or other competitions. All or some of the crewmembers can wear a tactile apparatus 101. The tactile apparatus 101 can replace or supplement the base instrumentation that may be installed on the yacht. Base instrumentation may provide information about yacht speed, yacht direction, yacht location, disposition of the yacht, tiller/wheel position, sail trim, wind speed, wind direction, etc. The base information can be displayed on data readers. In the event that data readers on the yacht fail, the tactile apparatus 101 can replace or supplement the data readers to help ensure optimal performance of the yacht even during yacht equipment malfunction. The tactile apparatus 101 can also serve as a warning device when base instrumentation or other equipment on the yacht fails. For example, the skipper can be alerted when any base instrumentation has malfunctioned such as, for example, when a base instrument stops outputting a signal.

The controller 110 can monitor sensor data such as, for example, wind direction, wind strength, location of course markers (e.g., buoys), current position of the yacht. The controller 110 can monitor sea state, tide, and rig selection (numbers 1, 2, 3, etc.). The controller 110 can determine an optimal heading or optimal plan of progress for the yacht based on the monitored data and communicate the optimal heading to a helmsman wearing the tactile apparatus 101, including, for example, a tactile vest. The controller 110 can generate a tactile message conveying to the helmsman when there is an opportunity, for example, to take advantage of a temporary or permanent change in sailing conditions. The change in sailing conditions can be change in wind speed and/or direction. The tactile apparatus 101 can help a helmsman realize the change in sailing conditions in real time. The controller 110, using observer algorithms as described herein, can collect data when the sail trim and/or yacht direction was optimum in the past. The collected data can be stored in memory 304. Using the collected data for optimum sail trim and/or yacht direction, the controller 110 can determine the theoretically optimum sail trim and/or yacht direction based on the sailing conditions. The helmsman can initially set sail trim and/or yacht direction using base instrumentation (e.g., data readers) and receive tactile messages that help fine tune or make final adjustments to the sail trim and/or tiller/wheel position. For example, the helmsman may feel a gradient cue with varying intensity on his/her abdomen and/or chest relating to the front sail trim—the further away the sail trim is away from optimum, the larger the gradient and/or intensity. In addition, the helmsman may feel a vertical gradient with varying intensity on his/her back relating yacht direction (related to the tiller/wheel position)—the further away the yacht direction is away from optimum, the larger the gradient and/or intensity.

As another example, the helmsman can receive a tactile message that can help further optimize yacht course. When the goal of the crew is to end up at a specific point faster, the controller 110 can determine if the theoretical optimum sail trim and/or yacht direction can be changed to better suit the sailing conditions. The theoretical course line discussed herein as theoretical optimum sail trim and/or yacht direction can be the fastest approach to getting to a specific point. However, the controller 110 may determine that the theoretical optimum sail trim and/or yacht direction may not be the fastest approach to getting to a specific point. For example, the controller 110 can determine that the yacht may gain more speed at a different sail trim and/or yacht direction than the theoretical optimum sail trim and/or yacht direction. The controller 110 can generate a tactile message to the helmsman that conveys a different sail trim and/or yacht direction from the theoretical optimum sail trim and/or yacht direction along with the potential performance improvement, such as increased speed. The tactile messaging patterns related to sail trim and/or yacht course can be as described herein. In some embodiments, the controller 110 can generate a gradient cue on a different part of the vest conveying tactile messages related to the difference between the theoretical optimum sail trim and/or yacht direction and the potentially faster sail trim and/or yacht direction—the larger the difference, the larger the gradient and/or intensity of the tactile message.

The controller 110 can continuously monitor the yacht speed, and convey in real time any change in yacht speed. The helmsman can make adjustments to sail trim and/or yacht direction to either maximize speed gain or minimize speed loss. The real time effect of the adjustments on yacht speed can be conveyed to the helmsman via a tactile message. For example, the helmsman may feel a gradient cue on a predetermined part of the vest that changes in gradient and/or intensity as yacht speed changes. The helmsman may feel a downwardly gradient cue with varying intensity if adjustments decreased yacht speed. Conversely, the helmsman may feel an upwardly gradient cue with varying intensity if the adjustments increase yacht speed. The tactile message communicating the yacht speed and/or change in yacht speed can replace or supplement the base instruments conveying yacht speed and/or change in yacht speed.

To further optimize yacht performance, the controller 110 can monitor the performance of a nearby yacht, including position and change in position of the nearby yacht. For example, the controller 110 can receive information related to the position and change in position of the nearby yacht from yacht sensors and/or a global positioning system. The system can alter or re-prioritize tactile messages based on position and change in position of the nearby yacht. For example, depending on the position and change in position (trajectory) of the nearby yacht, the system may modify the tactile messages relating to tiller/wheel position, sail trim, yacht direction, and/or the like.

The controller 110 can assess whether the nearby yacht performs better or worse than the helmsman's yacht. For example, the controller 110 can determine when the nearby yacht performs better or worse based on a comparison of one or more tacks performed by both the helmsman's yacht and the nearby yacht. The controller 110 can determine the cause of the differences in the one or more tack performances and generate an exception report that can be conveyed to the helmsman via a tactile message. For example, the controller 110 may determine that the setting of a sail sheet pulley on the deck is not optimized based on a time difference of tack performances. The helmsman may send a message to a crewmember communicating any adjustments to be made to, for example, the sheet pulley. In some embodiments, the exception report can also be conveyed directly to a crewmember to adjust the setting of the sheet pulley. The crewmember may then either adjust the settings of the sheet pulley, or wait for further instructions from the helmsman to do so. When the crewmember simultaneously (with the helmsman) receives the exception report, the crewmember is given a forewarning to a possible adjustment about to be commanded by the helmsman. The helmsman can then monitor the next tack to see if the adjustments improved yacht performance (or tack performance) in comparison with the nearby yacht.

As another example, the helmsman may receive a tactile message that conveys lay lines and/or course boundaries. A lay line can be the point where a yacht should make a turn to optimize its progress to the next specific point (i.e., a buoy). The controller 110 can monitor the yacht's current position and convey to the helmsman when the lay line is approaching or convey the point when the yacht reaches the lay line. For example, the helmsman may feel an increasing gradient cue with varying intensity at a predetermined spot on the vest as the yacht approaches closer to a lay line and/or course boundary. As another example, the gradient cue may increase toward a tactile reference point on the vest as the yacht approaches closer to the lay line and/or course boundary. When the helmsman receives information regarding the lay line in real time, the helmsman can more fully concentrate on optimally controlling the yacht, such as turning (tacking) procedures, to help maintain yacht speed. Receiving information regarding the lay line in real time can help the helmsman bring the yacht as close as possible to the lay line.

The controller 110 can generate a tactile message conveying when a yacht is approaching course boundary lines. Receiving information regarding the course boundary lines in real time can help alert the helmsman when the yacht is approaching too close to a boundary line. Yachts may have a system of lights to warn a helmsman when the yacht is approaching course boundaries, but as discussed herein, a tactile apparatus 101 can either replace or supplement any visual or auditory system provided on the yacht.

As another example, the rate of turning around a specific point (i.e., a buoy) may be optimized, similar to as discussed herein for motorsport racing regarding entry and exit speeds around a corner. The controller 110 can monitor tiller/wheel position, sail trim, yacht direction, location of the yacht, location of the buoy, wind strength, wind direction, sea state, and/or sea tide to determine an optimum speed approaching the buoy, coming around the buoy, and/or moving away from the buoy. For example, based on the sailing conditions, yacht performance may be optimized by approaching the buoy at a slower speed such that that coming around buoy and/or moving away from the buoy may be accomplished more efficiently such that the overall performance (speed) of the yacht is optimized. The controller 110 can generate a tactile message conveying to the helmsman the optimum tiller setting to get around the buoy as quickly as possible. For example, the helmsman may feel a tactile gradient cue at a predetermined spot on the tactile vest that increases in gradient and/or intensity as the actual tiller setting is moved further away from the optimum tiller setting.

During some sailing competitions, the (least) distance between the yacht and the buoy may be regulated. Similar to lay line and/or course boundary tactile messages, the controller 110 can generate a tactile message conveying to helmsman when the yacht is too close and/or approaching too close to the buoy. The controller 110 can monitor tiller/wheel position, sail trim, yacht direction, location of the yacht, location of the buoy, wind strength, wind direction, sea state, and/or sea tide to determine an optimum entry and exit path around the buoy as discussed herein. For example, based on sailing conditions, variables being monitored by the controller 110, and/or the regulated distance between the yacht and buoy, an optimum entry line may initially place the yacht further away from the buoy than the regulated distance such that the yacht may turn at a slower rate and maintain more speed (overall momentum) coming around the buoy. The controller 110 can generate a tactile message communicating to the helmsman deviation of the yacht path from the optimum entry and exit line as described herein. As another example, if the sailing conditions are light (i.e., slow wind speed), the helmsman may desire to keep the yacht balanced (more upright). An upright yacht can be more easily controlled by subtle changes to the control inputs. More subtle changes in control inputs can result in smoother changes in yacht progress that can help maintain yacht speed.

As another example, the controller 110 can monitor the location of the crewmembers on the boat. For example, each crewmember vest may include a position locator circuit which monitors and broadcasts the vest's position relative to a stationary beacon mounted on the yacht. When a crewmember is overboard, the controller 110 can convey a tactile message indicating to the other crewmembers or select group of crewmembers that a crewmember is overboard. The controller 110 can determine optimum yacht performance as described herein to change course and pick up the overboard crewmember. In some boat racing competitions, a yacht team may continue without picking up an overboard crewmember in exchange for taking a penalty. The controller 110 can determine based on sailing conditions an estimated loss in time to pick up the overboard crewmember and communicate this information to the helmsman and/or skipper via a tactile message. The helmsman may use this information to determine how overall performance or standing in the race would be affected by either turning around to pick up the crewmember or continuing with the race while taking the penalty. In some embodiments, the controller 110 can determine a predicted change in race standing based on either picking up or leaving behind the overboard crewmember and convey the prediction to the helmsman via a tactile message.

The controller 110 can determine the desired location on the yacht of each crewmember based on sailing conditions and, for example, each crewmembers weight and/or duties to be performed. For example, during yacht lean, it may be desirable for some or all of the crewmembers to be at a particular location and/or side of the yacht to help prevent further lean. The controller 110 can generate a tactile message to convey to each crewmember the desired position for the crewmember. For example, the controller 110 can generate a tactile cue at a predetermined spot on the vest corresponding to a particular location on the yacht. The controller 110 may determine that some crewmembers will have to remain mobile based on the crewmember's function and communicate to some crewmembers, but not others, an optimal location and/or side of the yacht to optimize yacht lean.

In some embodiments, each tactile vest may also serve as a life vest. For example, the tactile vest may include a sufficient quantity of an appropriate high buoyancy material to serve as a regulation-compliant life vest, and/or may include one or more inflatable bladders.

Examples of Yacht Racing Applications—Trimmer Messages

A trimmer controls the trim of the sails. Similar to the tactile messages received by the helmsman, the trimmer can receive tactile messages generated by the controller 110 that communicate current sail trim versus optimum sail trim. For example, the trimmer may feel an increasing gradient cue with varying intensity at a predetermined spot on the vest—the larger the difference between the actual versus optimum sail trim, the larger the gradient and/or intensity. The optimum sail trim tactile message can include information regarding theoretical optimum sail trim and a potentially faster yacht speed sail trim. The controller 110 can monitor yacht lean and/or other yacht performance variables to determine, for example, the likelihood of the yacht tipping and/or the likelihood of the windward hull dropping into the water and communicate to the trimmer via tactile message the likelihood. For example, a gradient cue with varying intensity at a predetermined spot on the vest that increases as the likelihood increases.

For a particular wind speed and direction with a particular yacht heading (direction of progress), there can be an optimum sail trim for a particular tiller position. Under certain yacht and sailing conditions, a change in the tiller position can fail to change the direction of the yacht. This is known as "weather helm" and can happen when the trimmer fails to adjust the sail trim based on a wind gust. Thus, sail trim can influence the effectiveness of the tiller's ability to control the yacht. The controller 110 can monitor changes in wind speeds to communicate to the trimmer via tactile message when action is required to adjust the sail trim to help avoid "weather helm".

In some multiwall yachts with wingsails, wings, and/or foils, the trimmer can follow a sequence of base adjustments and then use a prime control input to make finer adjustments as required. The controller 110 can communicate to the trimmer via a tactile message the optimal base adjustment sequence and/or optimal prime control adjustments to achieve desired sail trim as described herein.

As another example, the controller 110 can monitor indicators on the sails that warn when the sails are not efficiently trimmed, resulting in, for example, luffing. Luffing indicators on the sails may not always be easily visible to the trimmer. The controller 110 can monitor the luffing indicators and determine optimal sail trim. The controller 110 can communicate to the trimmer via a tactile message the optimal sail trim as described herein. In some embodiments, the controller 110 can communicate via a tactile message luffing indicator information. For example, the trimmer may feel a gradient cue with varying intensity that increases in gradient and/or intensity as the luffing indicators send signals indicating a higher likelihood of luffing or actual luffing taking place. The tactile message can be at a predetermined spot on the vest correlated to a particular sail of the yacht.

As another example, the controller 110 can monitor when the sail sheets get caught in a wench. When the sail sheets are caught in a wench, the sail sheets cannot be readily adjusted. The controller 110 can determine when the sail sheets cannot be readily adjusted to communicate to the crewmember via a tactile message in real time the possibility that a sail sheet is caught. For example, a particular tactor may activate that is correlated to a particular wench, communicating to the trimmer to check the wench. Early detection by the crewmembers of a problem such as caught sheets can help increase the ability to quickly and easily fix the problem.

Other Sports or Applications

A tactile apparatus 101 can be used in Freestyle Moto X and other extreme sports that could benefit from an augmented sense of feel of the control inputs and resulting reactions based on those control inputs. A tactile apparatus 101 can deliver a tactile message about spatial information through a global positioning system, gyro, and/or accelerometer that can be built into the tactile apparatus 101 and monitored by the controller 110. For example, in Freestyle Moto X, a tactile message can augment a driver's sense of location in relation to a landing point to safely maximize performance. The tactile message can be a gradient cue with varying intensity on the driver's torso (abdomen, chest, and/or back) relating to a driver's orientation relative to the ground. The gradient can increase, decrease, or change in intensity as the driver rotates, twists, and/or spins through a trick. The position tactile message can either be a constant tactile cue, or communicated at certain time intervals or reference points during the trick. The tactile apparatus 101 can utilize reference points and location of the driver to communicate to the driver if the driver has over or under rotated, twisted, and/or spun relative to a predetermined driver position at a particular reference point. The tactile message can increase, decrease, or change in intensity based on any over or under rotation, twisting, and/or spinning. The tactile message can either be a constant tactile cue, or communicated at certain time intervals or reference points when any over or under rotation, twisting, and/or spinning is detected.

As another example, a tactile message can communicate if speed of the vehicle is above or below a certain threshold needed to perform a particular maneuver. The tactile message can be a gradient cue with varying intensity that decreases in level or intensity or ceases altogether when the speed is between a minimum and maximum threshold needed for a particular maneuver. The tactile message can also increase in level and/or intensity to a certain point at which the driver knows that the speed is optimum to perform a particular maneuver. The tactile message can be activation of a particular activator 116 at which point alerting the driver that optimum speed is being achieved.

A tactile apparatus can be used in speed performance sports without vehicles such as downhill skiing. A tactile apparatus can be utilized with a global positioning system to communicate a tactile message about time gain or loss from reference laps, time gain or loss from reference points on a racecourse. The auxiliary information monitored by the controller 110 can include momentum and speed. A tactile message can communicate in real time to a user the effects of, for example, a downhill ski technique on the momentum and/or speed. A slow entry to a gate that results in greater exit speed over a longer distance would be immediately reinforced to a user through a tactile message such as a gradient cue with varying intensity on their torso (abdomen, chest, and/or back) relating to the real time momentum and/or speed—the greater the momentum and/or speed, the greater the gradient and/or intensity. A tactile message can also communicate threshold information, such as an activator 116 associated with momentum and/or speed is above a certain threshold, letting the athlete know that optimum speed was or is being achieved. The immediate feedback can allow an athlete to identify a superior technique as soon as it is used.

A tactile message can communicate if speed of the athlete is above or below a certain threshold needed to perform a particular maneuver. The tactile message can be a gradient cue with varying intensity that decreases in level or intensity or ceases altogether when the speed is between a minimum and maximum threshold needed for a particular maneuver. The tactile message can also increase in level and/or intensity to a certain point at which the athlete knows that the speed is optimum to perform a particular maneuver. The tactile message can be activation of a particular activator 116 at which point alerting the athlete that optimum speed is being achieved.

In other embodiments, a tactile apparatus can be utilized in non-motor vehicles such as locomotives to communicate a tactile message about reference points, power use, fuel consumption, wheel speed as determined by wheel rotation, wheel spin relative to other wheels, wheel slip, revolution per minute of the engine, brake line pressure, transitional input ramps, vehicle weight distribution, and vehicle momentum as described herein. As an example, a tactile system may receive locomotive location data that is monitored by a controller 110. Based on the locomotive location, a locomotive operator can be reminded by a tactile message to sound a locomotive horn at various positions on the track, such as at grade crossings. A tactile message can be activation of a particular activator 116 correlated with the locomotive horn, letting the operator know it is time to sound the horn. The activator 116 can also remain activated for the duration of needing to sound the horn. Alternatively, the activator 116 may vibrate again when it is time to deactivate the horn after the first vibration letting the operator know when to activate the horn.

The tactile system can also use reference point data monitored by the controller 110 to communicate to the operator if the train is traveling at an optimum speed based on an approaching corner. For example, the operator can receive a gradient cue with varying intensity on their torso (abdomen, chest, and/or back) which increases in level or intensity based on how much the speed of the locomotive is outside an optimum range for a particular approaching corner. If the speed is too high, the tactile message may increase in gradient level and/or intensity moving up the operator's torso (abdomen to chest). If the speed is too low, the tactile message may increase in gradient level and/or intensity moving down the operator's torso (chest to abdomen).

Terminology

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A system for improving racecar driver performance, the system comprising:
   a vest that is adapted to be worn by a driver of a racecar, said vest including a plurality of tactile devices capable of communicating tactile signals to the driver; and
   a controller that controls the tactile devices to communicate performance-related information to the driver substantially in real time during movement of the racecar, said controller configured to receive vehicle information, including vehicle information collected by vehicle sensors of the racecar, and configured to use the vehicle information to select tactile messages to convey to the driver, said tactile messages including a stimulation pattern that notifies the driver of wear of a tire of the racecar based at least partly on the vehicle information collected by the vehicle sensors.

2. The system of claim 1, wherein the wear of the tire is based at least partly on a weight of the racecar distributed on a particular wheel of the racecar associated with the tire.

3. The system of claim 1, wherein the controller is further configured to:
   calculate the wear of the tire based at least partly on the vehicle information collected by the vehicle sensors; and
   determine an estimated remaining life of the tire based at least partly on the wear of the tire; and
   compare the estimated remaining life of the tire with a predetermined threshold; and
   determine whether to output the stimulation pattern based at least partly on a result of the comparison.

4. The system of claim 3, wherein the stimulation pattern notifies the driver of the estimated remaining life of the tire.

5. The system of claim 3, wherein the controller is further configured to convey the stimulation pattern when the estimated remaining life of the tire is below the predetermined threshold.

6. The system of claim 3, wherein the controller is further configured to convey the stimulation pattern when the estimated remaining life of the tire is above the predetermined threshold.

7. The system of claim 3, wherein the controller is further configured to determine an optimal tire slip based at least partly on the estimated remaining life of the tire to maximize grip of the tire on a racetrack.

8. The system of claim 1, wherein the controller is further configured to:
   compare the wear of the tire with a predetermined threshold; and
   convey the stimulation pattern to the driver when the wear of the tire is above the predetermined threshold,
   wherein the predetermined threshold corresponds to at least one of a completed lap around a racetrack, a particular segment of the racetrack, or a particular maneuver of the driver for controlling the racecar.

9. The system of claim 1, wherein the controller is further configured to:
   compare the wear of the tire with a predetermined threshold; and
   convey the stimulation pattern to the driver when the wear of the tire is below the predetermined threshold,
   wherein the predetermined threshold corresponds to at least one of a completed lap around a racetrack, a particular segment of the racetrack, or a particular maneuver of the driver for controlling the racecar.

10. The system of claim 1, wherein the stimulation pattern is communicated to the driver substantially in real time based at least partly on the controller determining a predetermined amount of a weight of the racecar being distributed on a particular wheel of the racecar associated with the tire.

11. A system for improving racecar driver performance, the system comprising:
   a tactile apparatus comprising a plurality of tactile devices capable of communicating tactile signals to a driver of a racecar; and
   a controller that controls the tactile devices to communicate performance-related information to the driver substantially in real time during movement of the racecar, said controller configured to receive vehicle information, including vehicle information collected by vehicle sensors of the racecar, and configured to use the vehicle information to select tactile messages to convey to the driver, said tactile messages including a stimulation pattern that notifies the driver of wear of a tire of the racecar based at least partly on the vehicle information collected by the vehicle sensors.

12. The system of claim 11, wherein the wear of the tire is based at least partly on a weight of the racecar distributed on a particular wheel of the racecar associated with the tire.

13. The system of claim 11, wherein the controller is further configured to:
   calculate the wear of the tire based at least partly on the vehicle information collected by the vehicle sensors;
   determine an estimated remaining life of the tire based at least partly on the wear of the tire;
   compare the estimated remaining life of the tire with a predetermined threshold; and
   determine whether to output the stimulation pattern based at least partly on a result of the comparison.

14. The system of claim 13, wherein the controller is further configured to determine an optimum tire slip based at least partly on the estimated remaining life of the tire to maximize grip of the tire on a racetrack.

15. The system of claim 14, wherein the controller is further configured to determine the optimum tire slip based at least partly on spin of the tire relative to other tires of the racecar.

16. The system of claim 15, wherein the tire is part of a front wheel of the racecar and the other tires part of rear wheels of the racecar or wherein the tire is part of a rear wheel of the racecar and the other tires are part of front wheels of the racecar.

17. The system of claim 14, wherein the controller is further configured to determine the optimum tire slip based at least partly on spin of the tire relative to a surface of travel of the racecar.

18. The system of claim 14, wherein the controller is further configured to determine an optimum steering angle based at least partly on the optimum tire slip to maximize grip of the tire on the racetrack.

19. The system of claim 14, wherein the stimulation pattern notifies the driver of a transitional input ramp associated with steering the racecar to achieve the optimum tire slip.

20. The system of claim 11, wherein the controller is further configured to:
   compare the wear of the tire with a predetermined threshold; and
   convey the stimulation pattern to the driver in response to determining a level of the wear of the tire relative to the predetermined threshold,
   wherein the predetermined threshold corresponds to at least one of a completed lap around a racetrack, a particular segment of the racetrack, or a particular maneuver of the driver for controlling the racecar.

21. The system of claim 11, wherein at least one of a vest, a belt, a headband, an armband, a wristband, a forearm band, a thigh band, a steering wheel, a steering wheel paddle, a brake pedal, an accelerator pedal, or a driver seat comprises the tactile apparatus.

22. A system for improving racecar driver performance, the system comprising:
   a plurality of tactile devices capable of communicating tactile signals to a driver of a racecar; and
   a controller that controls the tactile devices to communicate performance-related information to the driver during movement of the racecar, said controller configured to receive vehicle information, including vehicle information collected by vehicle sensors of the racecar, and configured to use the vehicle information to select tactile messages to convey to the driver, said tactile messages including a stimulation pattern that notifies the driver of wear of a tire of the racecar based at least partly on the vehicle information collected by the vehicle sensors.

23. The system of claim 22, wherein the wear of the tire is based at least partly on a weight of the racecar distributed on a particular wheel of the racecar associated with the tire.

24. The system of claim 22, wherein the controller is further configured to determine an optimum tire slip based at least partly on the wear of the tire to maximize grip of the tire on a racetrack.

25. The system of claim 24, wherein the controller is further configured to determine the optimum tire slip based at least partly on rotation of the tire relative to other tires of the racecar.

26. The system of claim 25, wherein the tire is part of a front wheel of the racecar and the other tires are part of rear wheels of the racecar or wherein the tire is part of a rear wheel of the racecar and the other tires are part of front wheels of the racecar.

27. The system of claim 24, wherein the controller is further configured to determine the optimum tire slip based at least partly on rotation of the tire relative to a surface of travel of the racecar.

28. The system of claim 27, wherein the optimum tire slip is based at least partly on the rotation of the tire being slower relative to a speed of travel over the surface of travel of the racecar.

29. The system of claim 24, wherein the controller is further configured to determine an optimum steering angle based at least partly on the optimum tire slip to maximize grip of the tire on the racetrack.

30. The system of claim 24, wherein the stimulation pattern notifies the driver of a transitional input ramp associated with steering the racecar to achieve the optimum tire slip.

31. The system of claim 22, wherein at least one of a vest, a belt, a headband, an armband, a wristband, a forearm band, a thigh band, a steering wheel, a steering wheel paddle, a brake pedal, an accelerator pedal, or a driver seat comprises the tactile devices.

* * * * *